(12) United States Patent
Ott et al.

(10) Patent No.: US 11,587,537 B2
(45) Date of Patent: Feb. 21, 2023

(54) CHORD AND NOTE ASSIST ASSEMBLY

(71) Applicant: Omniteletech, LLC, Falls Church, VA (US)

(72) Inventors: Richard Ott, Falls Church, VA (US); Alborz Alaeddini, Falls Church, VA (US)

(73) Assignee: Omniteletech, LLC, Falls Church, VA (US)

( * ) Notice: Subject to any disclaimer, the term of this patent is extended or adjusted under 35 U.S.C. 154(b) by 0 days.

(21) Appl. No.: 17/400,335

(22) Filed: Aug. 12, 2021

(65) Prior Publication Data

US 2022/0051646 A1 Feb. 17, 2022

Related U.S. Application Data

(60) Provisional application No. 63/064,654, filed on Aug. 12, 2020.

(51) Int. Cl.
*G10D 3/00* (2020.01)
*G09B 15/02* (2006.01)

(52) U.S. Cl.
CPC .............. *G10D 3/00* (2013.01); *G09B 15/023* (2013.01)

(58) Field of Classification Search
CPC ................................ G10D 3/00; G09B 15/023
See application file for complete search history.

(56) References Cited

U.S. PATENT DOCUMENTS

| | | | | | |
|---|---|---|---|---|---|
| 627,410 | A | * | 6/1899 | Panelli ..................... | G10D 3/08 84/317 |
| 637,273 | A | * | 11/1899 | Miller ..................... | G10G 5/005 84/320 |
| 831,238 | A | * | 9/1906 | Graus ..................... | G10D 3/08 84/317 |
| 1,094,038 | A | * | 4/1914 | Weaver et al. .......... | G10D 3/08 84/317 |
| 1,120,091 | A | * | 12/1914 | Schmidt ................... | G10D 3/08 84/317 |
| 1,374,388 | A | * | 4/1921 | Reed ........................ | G10D 3/08 984/116 |
| 1,437,026 | A | * | 11/1922 | Spartivento .............. | G10D 3/08 84/317 |

(Continued)

OTHER PUBLICATIONS https://www.rock-itbarre.com/. 2018.

(Continued)

*Primary Examiner* — Robert W Horn
(74) *Attorney, Agent, or Firm* — Welsh Flaxman & Gitler LLC

(57) ABSTRACT

A chord and/or note assist assembly includes a chord and/or note forming aid having a plurality of multi-position string engaging assemblies that engage strings of a guitar in a controlled manner so as to define chords associated with playing a guitar and an extension device having a plurality of multi-position string engaging assemblies that engage strings of a guitar in a controlled manner so as to define chords associated with playing a guitar. An electronic microprocessor circuit board is electrically linked to a solid-state memory to control the plurality of multi-position string engaging assemblies of both the chord and/or note forming aid and the extension device.

17 Claims, 16 Drawing Sheets

(56) References Cited

U.S. PATENT DOCUMENTS

| | | | | |
|---|---|---|---|---|
| 1,635,542 A * | 7/1927 | Conner | G10D 3/08 | 984/116 |
| 1,785,311 A * | 12/1930 | Johnson | G10D 3/08 | 984/116 |
| 2,132,281 A * | 10/1938 | Adamson | G10D 3/08 | 984/116 |
| 2,517,000 A * | 8/1950 | La Rose | G10D 3/08 | 984/116 |
| 2,669,151 A * | 2/1954 | Maccaferri | G10D 3/08 | 984/116 |
| 2,798,398 A * | 7/1957 | Hayes | G10D 3/08 | 984/116 |
| 3,433,112 A * | 3/1969 | Bradt | G10D 3/08 | 984/116 |
| 3,443,468 A * | 5/1969 | Kidwell | G10D 3/00 | 84/320 |
| 3,568,560 A * | 3/1971 | Chang | G10D 3/053 | 84/473 |
| 3,915,051 A * | 10/1975 | Kincaid | G10D 3/08 | 984/116 |
| 4,030,400 A * | 6/1977 | Del Castillo | G10D 3/08 | 984/116 |
| 4,331,059 A * | 5/1982 | Marabotto | G10D 3/08 | 984/116 |
| 4,545,282 A * | 10/1985 | Arnett | G10D 3/08 | 984/116 |
| 4,566,365 A * | 1/1986 | Huston, Jr. | G10D 3/08 | 984/116 |
| 4,622,880 A * | 11/1986 | Glemming | G10D 3/08 | 984/116 |
| 5,831,189 A * | 11/1998 | Edlund | G10D 3/08 | 84/317 |
| 6,753,466 B1 * | 6/2004 | Lee | G10H 1/342 | 84/669 |
| 7,307,203 B2 * | 12/2007 | Buffkin | G10D 3/08 | 84/286 |
| 7,812,233 B1 * | 10/2010 | Lee | G10H 1/20 | 84/646 |
| D669,117 S * | 10/2012 | de Neufville | D17/20 | |
| 8,319,082 B1 * | 11/2012 | Bacon | G10D 3/08 | 84/314 R |
| 8,835,731 B1 * | 9/2014 | Perry | G10D 3/08 | 84/317 |
| 9,076,413 B2 * | 7/2015 | Krumwiede | G10D 3/16 | |
| 10,643,585 B1 * | 5/2020 | Geeslin | G10D 1/05 | |
| 2017/0278496 A1 * | 9/2017 | Lin | G09B 15/023 | |
| 2022/0051646 A1 * | 2/2022 | Ott | G10D 3/147 | |

OTHER PUBLICATIONS

Intelligent Automatic Chord Selector Device Makes Playing the Guitar Easy. LC Media. May 5, 2014.

EZ-Chord for Guitar. Amazon.com. Jul. 16, 2004.

* cited by examiner

LED Display
Display of the Two-position Keys

Chords

| Keys   | 1/1  | 2/2 | 3/3  | 4/4 | 5/5 | 6/6 |
|--------|------|-----|------|-----|-----|-----|
| Chords | C/C7 | A/a | G/G7 | E/e | D/d | B/b |

Notes

| Keys  | 1/1  | 2/2  | 3/3  | 4/4  | 5/5  | 6/6  |
|-------|------|------|------|------|------|------|
| Notes | F/F# | A#/B | D#/E | G#/A | C/C# | F/F# |

FIG. 17

CHORD AND NOTE ASSIST ASSEMBLY

CROSS REFERENCE TO RELATED APPLICATION

This application claims the benefit of U.S. Provisional Patent Application Ser. No. 63/064,654, entitled "CHORD AND NOTE ASSIST ASSEMBLY," filed Aug. 12, 2020, which is incorporated herein by reference.

BACKGROUND OF THE INVENTION

1. Field of the Invention

The present invention relates to a chord assist assembly for playing fretted string instruments, especially fitted to an electric or acoustic guitar, that provides the ability to play an instrument with little, or no, ability or proficiency.

2. Description of the Related Art

Playing good music with a string of musical instruments is a longing for most youngsters or persons within inability to command an instrument. The guitar is an easily accessible musical instrument for youngsters because of its affordable price. However, learning and understanding mechanics necessary to produce chords and notes on the guitar is not easy, although it is essential for the players to be successful. Mastering the many types of fingerings or producing chords and their relation to one another is essential and requires mastery in order to inspire creativity. Any musical theory books demonstrate and refer to a vast array of chords. However, producing these chords in order to hear them in relation to each other is essential for musical development. Some devices for easily playing chords on the guitar are available. Yet, they are cumbersome, complex, very limited in their abilities, and unclear. The prior art has shown that there is no device that is simple and small, easy to use and compact, with the capability to construct any form or type of note or chord in music.

Needed, is a better method that makes a stronger impact on the mind of the beginning player in which learning is quicker and enjoyable. Notations must be looked into again and again to absorb everything contained within the black and white pages. It is the purpose of the current application to provide a device for note or chord generation, which has and ability to make a stronger impression if done in a clear simple manner. It is another purpose of the current application to provide an aiding instrument for a guitar player, who accidentally loses some of his or her fingers or is unable to command a fretted stringed instrument.

SUMMARY OF THE INVENTION

In one aspect a chord and/or note assist assembly includes a chord and/or note forming aid having a plurality of multi-position string engaging assemblies that engage strings of a guitar in a controlled manner so as to define chords associated with playing a guitar and an extension device having a plurality of multi-position string engaging assemblies that engage strings of a guitar in a controlled manner so as to define chords associated with playing a guitar. An electronic microprocessor circuit board is electrically linked to a solid-state memory to control the plurality of multi-position string engaging assemblies of both the chord and/or note forming aid and the extension device.

In some embodiments, the chord and/or note forming aid includes keypad box housing having a top wall, a bottom wall, a front wall extending between the top wall and the bottom wall, a rear wall extending between the top wall and the bottom wall, and lateral side walls extending between the top wall and the bottom wall.

In some embodiments, the bottom wall of chord and/or note forming aid includes a recessed section shaped and dimensioned in such a way that the neck of the guitar may be positioned therein.

In some embodiments, the bottom wall includes first and second bottom wall segments that connect directly to the respective lateral walls and lie in a plane that is generally perpendicular to the respective lateral wall and the recessed section is positioned between the first and second bottom wall segments.

In some embodiments, the recessed section of chord and/or note forming aid is defined by first and second recess side wall segments and a recess base segment.

In some embodiments, a strap harness of chord and/or note forming aid selectively extends across the recessed section in a manner frictionally holding a neck of a guitar within the recessed section.

In some embodiments, the strap harness is wide Velcro strap.

In some embodiments, each of the multi-position string engaging assemblies includes a solenoid extending from an aperture formed in the bottom wall.

In some embodiments, each of the solenoids includes a first end and a second end, the first end includes a coil in which an armature is positioned and the second end includes an extended portion of the armature.

In some embodiments, a string capture cap is secured to the free end of the extended portion of the armature, and the string capture cap is shaped and dimensioned to engage the strings of a guitar when the solenoid is actuated.

In some embodiments, a wireless transceiver is integrated with, or electrically coupled to the electronic microprocessor circuit board.

In some embodiments, the chord and/or note forming aid includes an LED readout.

In some embodiments, the extension device includes an extension device housing shaped and dimensioned for positioning over the frets of a guitar in a manner allowing a user to generate chords with only one finger of a person playing the guitar.

In some embodiments, the extension device housing includes a top wall, a bottom wall, a front wall extending between the top wall and the bottom wall, a rear wall extending between the top wall and the bottom wall, and lateral side walls extending between the top wall and the bottom wall.

In some embodiments, the bottom wall of the extension device includes a recessed section shaped and dimensioned in such a way that the neck of the guitar may be positioned therein.

In some embodiments, the bottom wall of the extension device includes first and second bottom wall segments that connect directly to the respective lateral walls and lie in a plane that is generally perpendicular to the respective lateral wall and the recessed section is positioned between the first and second bottom wall segments.

In some embodiments, the recessed section of the extension device is defined by first and second recess side wall segments and a recess base segment.

In some embodiments, the extension device includes a strap harness selectively extending across the recessed section in a manner frictionally holding a neck of a guitar within the recessed section.

Other advantages of the present invention will become apparent from the following detailed description when viewed in conjunction with the accompanying drawings, which set forth certain embodiments of the invention.

BRIEF DESCRIPTION OF THE DRAWINGS

FIG. 17 shows exemplary displays in accordance with use of the present chord and/or assist assembly.

DESCRIPTION OF THE PREFERRED EMBODIMENTS

Figure 1:
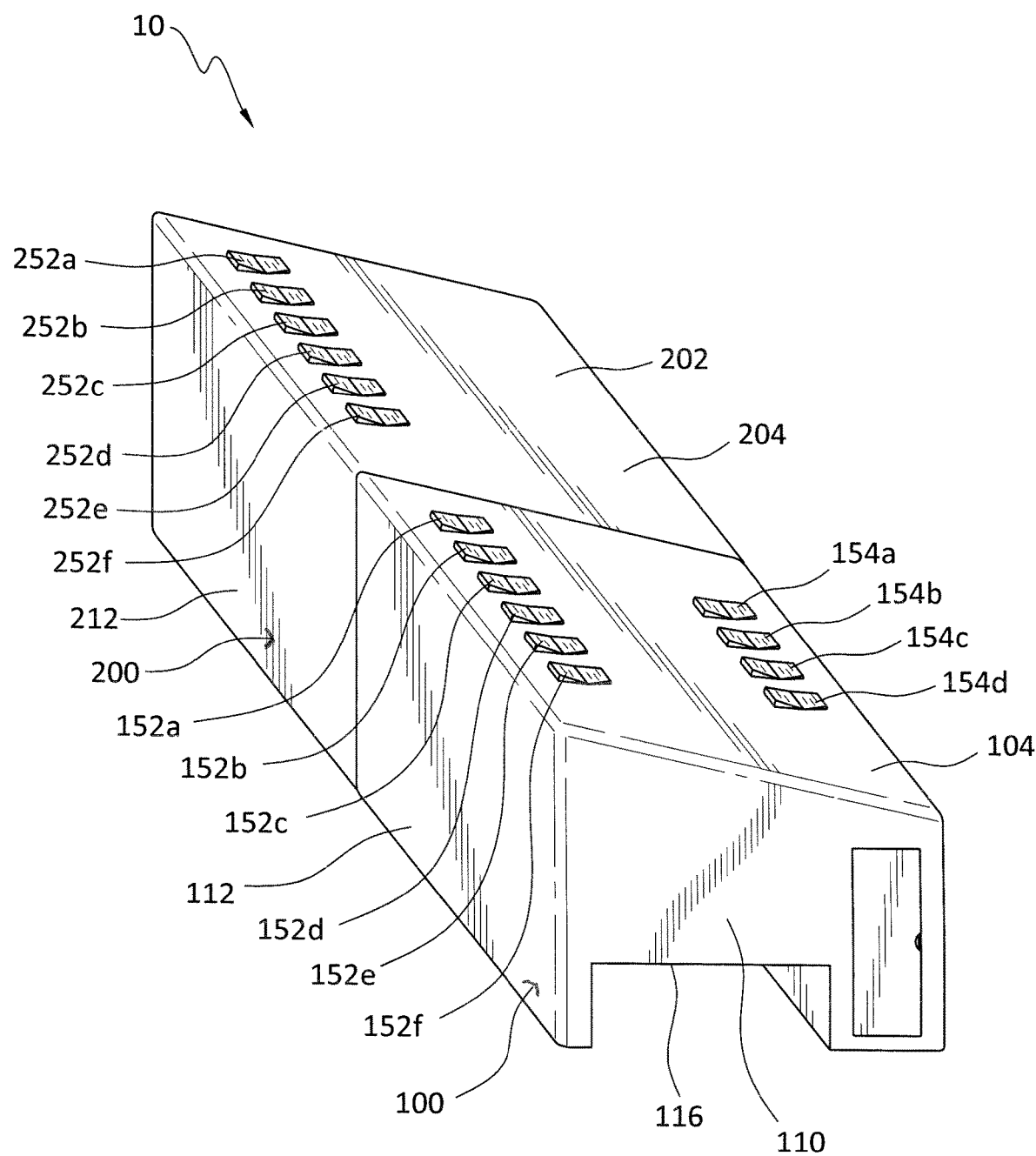
FIG. 1 is a perspective view showing the chord and/or assist assembly.
Figure 2:
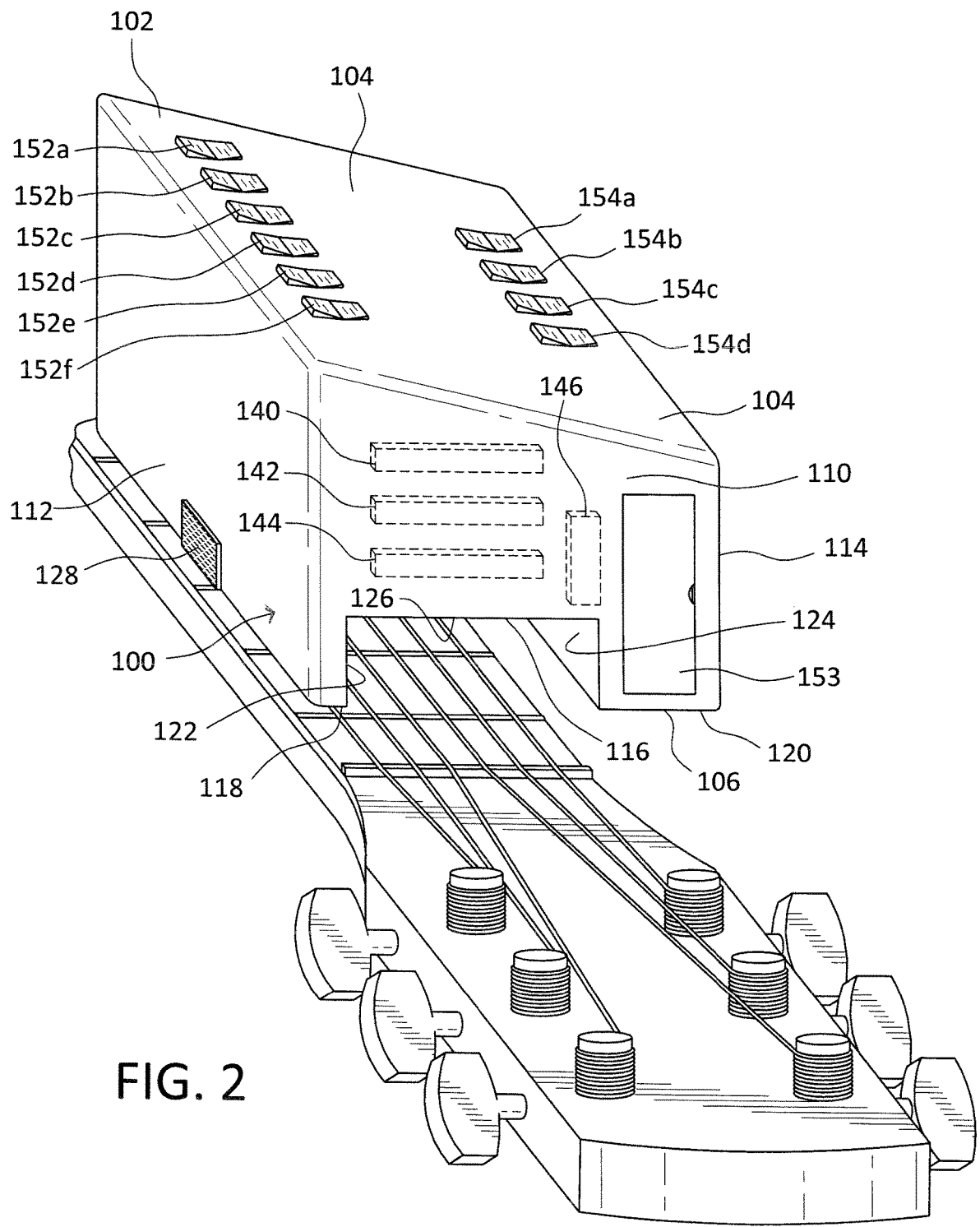
FIG. 2 is a top perspective view showing the chord and/or note forming aid above the first four frets of a guitar. As will be explained below in greater detail, on the unseen lateral wall is an LED readout for the player to see which groups and specific chords and/or notes and/or capo have been selected. Also, on top is a row of six bidirectional keys. Each key may be switched in either direction offering twelve selections. On the front is a door to access and replace the rechargeable battery and to access the computer controls. There is also a row of four bidirectional switches to select from the various groups of stored songs, chords, notes and capos.

The detailed embodiments are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to FIGS. 1 to 18, a chord and/or note assist assembly 10 is disclosed. The chord and/or note assist assembly 10 includes a chord and/or note forming aid 100 and an extension device 200 for playing fretted instruments. While the chord and/or note assist assembly 10 is disclosed herein below for use in conjunction with an electronic guitar, the chord and/or note assist assembly 10 may be used with a wide variety of electronic or acoustic fretted string instruments. The chord and/or note assist assembly 10 provides beginners, elderly persons, and handicapped persons with the ability to play guitar in a pleasant and convenient manner. The chord and/or note assist assembly 10 may also be used by experienced guitar players who develop new and unusual chords, as well as chords that are not physically possible to be played by the players fingers alone.

As will be appreciated based upon the following disclosure, the chord and/or note assist assembly 10 is computer based, programmable and can be controlled by a smartphone (either iPhone or Android). Similar to a personal computer, and as is described below in more detail, the chord and/or note assist assembly 10 has computer chips for both operational control and for memory management. The operational chip will control all the various hardware functions. Generally, chords and/or notes of a song are preprogrammed into the chord and/or note assist assembly 10 so that all that is required for the player is to press an actuation interface mechanism in the form of bidirectional keypad(s) 152a-f in a specific order while strumming to actuate chords/notes and to play a song. In accordance with other implementations, chords and/or notes of a song are preprogrammed into the chord and/or note assist assembly 10 so that all that is required for the player do is strum and the next chord/note is automatically in place for the next strum. Additionally, chord and/or note assist assembly 10 users will have use of a website that will be available for both uploading and downloading chords, notes, capos and/or full songs.

As discussed below, the chord and/or note assist assembly 10 is provided with a Bluetooth wireless transceiver 144 allowing for pairing of the chord and/or note assist assembly 10 with a smartphone (or other portable electronic device).

With this in mind, the smartphone, which also includes a Bluetooth wireless transceiver, has a dedicated app installed thereon. The dedicated app includes mechanisms for use with the chord and/or note assist assembly 10. By holding a button, the chord and/or note assist assembly 10 enters a pairing mode and the app running on the smartphone will detect and pair with the chord and/or note assist assembly 10. Once paired, the app on the smartphone allows the user to create instructions/actions to be run on the chord and/or note assist assembly 10. The app sends these instructions over the Bluetooth connection to the chord and/or note assist assembly 10. The chord and/or note assist assembly 10 acts according to the received instructions. The chord and/or note assist assembly 10 will periodically send information about itself to the app for details such as battery level and errors.

In accordance with the disclosed embodiment, the chord and/or note forming aid 100 is shaped and dimensioned to cover from the nut across the 1st fret through the 4th fret and the extension device 200 is shaped and dimensioned to cover from the $4^{th}$ fret across the 5th fret through the 12th fret. Thus, with the six strings and the twelve frets, 72 multi-position string engaging assemblies 130, 230 provide for all string engaging possibilities associated with the chord and/or note forming aid 100 and extension device 200.

The chord and/or note forming aid 100 includes a keypad box housing 102 shaped and dimensioned for positioning over the frets of a guitar in a manner allowing a user to generate chords with only one finger of a person playing the guitar. The keypad box housing 102 includes a top wall 104, a bottom wall 106, a front wall 110 extending between the top wall 104 and the bottom wall 106, a rear wall 108 extending between the top wall 104 and the bottom wall 106, and lateral side walls 112, 114 extending between the top wall 104 and the bottom wall 106. The top wall 104, front wall 110, rear wall 108, and lateral side walls 112, 114 are generally flat. The bottom wall 106 is shaped to fit above the neck of the guitar in the area of the frets and includes a longitudinally extending, recessed section 116 that extends from the front wall 110 to the rear wall 108 and wraps about the neck of the guitar.

With this in mind, the bottom wall 106 is considered to cover the entire extent of the surface opposite the top 104. The bottom wall 106 is structured so as to include the recessed section 116. With this in mind, the bottom wall 106 includes various segments that interconnect to for the recessed section 116 in such a way that the neck of the guitar may be positioned therein for use in accordance with the present invention.

The bottom wall therefore includes first and second bottom wall segments 118, 120 that connect directly to the respective lateral walls 112, 114 and lie in a plane that is generally perpendicular to the respective lateral wall 112, 114. The longitudinally extending, recessed section 116 is positioned between the first and second bottom wall segments 118, 120. The longitudinally extending, recessed section 116 is defined by first and second recess side wall segments 122, 124 and a recess base segment 126. The first and second recess side wall segments 122, 124 respectively extend from the first and second bottom wall segments 118, 120, and lie in a plane that is generally parallel to the respective lateral wall 112, 114. The recess base segment 126 extends between the first and second bottom wall segments 118, 120, and lies in plane that is perpendicular to the respective lateral wall 112, 114. As such the bottom wall 106 defines a generally U-shape when viewed along a cross section transverse to the longitudinal axis of the keypad box housing 102.

The keypad box housing 102 is held in position relative to the neck of the guitar through the provision of a strap harness 128 selectively extending across the longitudinally extending, recessed section 116 in a manner frictionally holding the neck of the guitar within the longitudinally extending, recessed section 116. In accordance with a disclosed embodiment, the strap harness 128 is wide Velcro strap will secure the chord and/or note forming aid 100 around the neck of the guitar between the nut and the fourth fret. While straps are provided in accordance with a disclosed embodiment, it is appreciated a variety of retaining mechanisms could be employed without departing form the spirit of the present invention.

In accordance with a disclosed embodiment, the chord and/or note forming aid 100 is about 5¼ inches long and slightly wider than the guitar neck (for example, approximately 3¼ inches wide). It is placed on the end of the neck of a guitar, between the nut and the fourth fret. As explained below in greater detail, the top wall 104 of the chord and/or note forming aid 100 has bidirectional keypads 152a-f and the top wall 104 is slightly sloped for both easy vision and access by the user.

The working components of the present chord and/or note forming aid 100 are housed within the keypad box housing 102 for operation in the manner described below. Actuation of the guitar strings is achieved by the provision of a plurality of multi-position string engaging assemblies 130 that engage strings of the guitar in a controlled manner so as to define chords associated with playing the guitar. Each of the multi-position string engaging assemblies 130 includes a solenoid 132 extending from an aperture 134 formed in the recess base segment 126 of the bottom wall 106. Each of the solenoids 132 includes a first end 132a and a second end 132b. The first end 132a includes the coil 135 in which the armature 136 is positioned and the second end 132b includes the extended portion 136e of the armature 136. A string capture cap 138 is secured to the free end of the extended portion 136e of the armature 136. The string capture cap 138 is shaped and dimensioned to engage the strings of the guitar when the solenoid 132 is actuated.

In accordance with a disclosed embodiment, 12 multi-position string engaging assemblies 130 are provided. The multi-position string engaging assemblies 130 are positioned for engagement with each of the 6 strings of the guitar at four different fret locations. As such, the multi-position string engaging assemblies 130 are arranged in the four rows of six multi-position string engaging assemblies 130 extending lateral across the bottom wall 106, in particular, the recess base segment 126.

It is preferred that only the six multi-position string engaging assemblies 130, in particular, the string capture cap 138, engage the guitar strings and that the remaining the structure of the chord and/or note assist assembly 10 is prevented from actually resting on or touching the guitar strings. As such, and in accordance with a disclosed embodiment, the chord and/or assist assembly 10 is prevented from resting upon the strings by the provision of stabilizer pair devices 127. Each of the stabilizer pair devices 127 is in the form of an inverted U-shape with a thin and elongated base member 127a and downwardly extending leg members 127b at the respective first and second ends of the base member 127a. The base member 127a is shaped and dimensioned to fit between rows of the six multi-position string engaging assemblies 130, that is, solenoid six packs 300a, 300b as discussed below, along the body of the bottom wall 106. Each of the downwardly extending leg members 127b includes a first end 129a secured to the base member 127a and free second end 129b shaped and dimensioned to fit on a fret.

The free second ends 129b of the respective the downwardly extending leg members 127b are crescent shaped. Considering the shape of the free second ends 129b, its bottom surface 180 includes a concave central section 182 at points 182a, 182b at opposite ends of the concave central section 182. The points 182a, 182b are aligned to point at open spaces on opposite sides of a fret.

In accordance with a disclosed embodiment, the stabilizer pair devices 127 are respectively positioned behind the first solenoid six pack 300a so as to rest on the first fret and the behind the third solenoid six pack 300b so as to rest on the third fret. The downwardly extending leg members 127b are oriented to be placed above and rest on the first and third frets between strings 2 and 3 on one side and between strings 4 and 5 on the other side.

In accordance with another embodiment, and with reference to FIGS. 9, 10, 11, and 12, thin longitudinal rails in the form of four stabilizers 127' protrude from the recess base segment 126 and are positioned to rest between the two middle guitar strings (for example, strings 3 and 4). The stabilizers 127' are elongated members with a first end 129a' secured to the recess base segment 126 and a free second end 129b' extending away from the recess base segment for engagement with the neck of the guitar. The stabilizers 127' each include a longitudinal axis that is parallel to the longitudinal axis of the chord and/or note forming aid 100. In accordance with a disclosed embodiment, four stabilizers 127' from the chord and/or assist assembly 10 keep it from resting on the strings. The four stabilizers 127' extend from the chord and/or assist assembly 10 to the area of the guitar neck between the second and third strings and between the fourth and fifth strings between the nut and the first fret and between the third fret and the fourth fret. Considering this embodiment, it is appreciated the stabilizer should be made of a non-scratching material so as to protect the surface of the neck of the guitar. Another contemplated alternative would include a pair of longitudinal rails extending downwardly from the recess base segment such that they rest between adjacent guitar strings; for example, one would rest between strings 2 and 3 and the other would rest between strings 4 and 5. This alternative provides more balance preventing tilting to either side. In either solution the rails would rest on the frets and not touch nor harm the neck.

Control of the solenoids 132 of the multi-position string engaging assemblies 130 is achieved through the provision of an electronic microprocessor circuit board 140 electrically linked to a solid-state memory 142 (that may be integrated with the circuit board or electrically linked thereto). The electronic microprocessor circuit board 140 is electrically linked to the solenoids 132 to control extension and retraction of the armatures 136 in a predefined manner. As a result, the computer chips of the electronic microprocessor circuit board 140 provide for operational control and the computer chips of the solid-state memory provide for memory management.

The chord and/or note assist assembly 10 also includes a software management operating system for controlling its operation. The software management operating system manages all operations and storage requirements. Periodic upgrades will be downloadable from a website to users as needed. Operating software is provided (preferably, wirelessly via Bluetooth) for both an iPhone (app store), an Android phone (Google Plays App), and for Windows PCs for the control of the software management operating system of the chord and/or note assist assembly 10 and its content.

The software management operating system allows for the following:

Users can set up the storage for the various notes and chords used by different songs.

Users may either enter all the individual notes and chords for a song by themselves or download available complete songs with all of their notes and chords if available on a website or other websites.

Programming each of the control keys to show on the LED (see the embodiment disclosed herein with reference to FIG. 3) the chosen song title and what note or chord each of the Finger Keys will play for each requested song.

Setting up the Finger Keys with requested notes or chords or both so that the player may play the guitar without a pre-programmed song. This is like playing a guitar but without having to know which strings to press at which frets.

Users may play a complete song of notes and/or chords by only strumming the strings and not need to press any of the finger keys. The software Management will 'feed' the needed notes and chords in the correct order at the right time after each strum of the guitar strings.

Actuation of the solenoids is achieved using known actuation circuitry and may be varied as desired. For example, the bidirectional keypads 152a-f on the top wall 102 are pressed to send signals to the electronic microprocessor circuit board 140 identifying chords and/or notes of a song and the electronic microprocessor circuit board 140 thereafter instructs the required solenoids 132 to extend and engage desired strings of the guitar. In accordance with a disclosed embodiment, the bidirectional keypads allow for actuation in by pressing either the first end thereof or the second end thereof to send first and second distinct signals. Although bidirectional keypads of a specific size are shown in accordance with the disclosed embodiment, the size of the bidirectional keypads may be varied as needed, for example, the bidirectional keypads may be of a size similar to the keys disclosed with reference to FIGS. 19 and 20. As mentioned above, and in accordance with other implementations, chords and/or notes of a song are preprogrammed into the chord and/or note assist assembly 10 so that all that is required for the player do is press a sequence of keypads 152a-f to start a song and, thereafter, the user need only strum and the next chord/not is automatically in place for the next strum. Additionally, chord and/or note assist assembly 10 users will have use of a website that will be available for both uploading and downloading chords, notes, capos and/or full songs.

The chord and/or note forming aid 100 is further provided with a wireless transceiver 144 (for example, Bluetooth) integrated with, or electrically coupled to the electronic microprocessor circuit board 140 and a battery 146 (which may be replaceable and/or rechargeable).

In accordance with a disclosed embodiment the electronic microprocessor circuit board 140, the solid-state memory 142, and Bluetooth wireless transceiver 144 are positioned inside of the keypad box housing 102 just below the bidirectional keypads 152a-f positioned in the top wall 104 of the keypad box housing 102, wherein the solid-state memory 142 is installed inside the keypad box housing 102 just above the electronic microprocessor circuit board 140. The keypad box housing 102 is further provided with an access door 153 to allow for access to both the control elements discussed above and the battery(ies).

The chord and/or note forming aid 100 control configuration will consist of a two 8-bit shift registers (and possibly an EEPROM depending if the microcontroller that is used changes). In accordance with a disclosed embodiment, a Raspberry Pi 3, or other similar or acceptable, is used as the controller with Raspbian being our Linux-OS. The storage capacity of the Raspberry Pi is sufficient for the functionals of the chord and/or note assist assembly 10 and the code can be stored directly on the Raspberry Pi's memory and simply pass the necessary information to the shift registers when needed. Each chord will be stored as a chord name attribute with a corresponding tabular notation of the chord itself.

With this method chord progression are converted to binary information. For user created chords the program simply receives an input tabular notation from the user and applies the same process as it would for the manufacturers chord data to convert it to binary. The shift register is then be configured by the microcontroller to output a 9-bit binary representation of each chord that is selected by the user. The output of the shift register will be the input logic of the AND gates of the actuators.

The first six least significant bits (LSB) will represent the strings of the guitar, the following bits will represent the fret number in chronological manner such that the 7th bit would represent the first fret. With this configuration additional modules (for example, the extension device 200 disclosed herein) may be implemented to cover the higher fret numbers with ease (considering the 1st fret to be the very top fret on the guitar neck after the nut followed by the 2nd fret.) One need only add 1-bit position to the most significant bit for every new fret that is covered by additional modules.

In particular, and with reference to FIGS. 1 to 8, the present chord and/or note forming aid 100 is positioned over the first four frets of the guitar. The lateral wall 114 of the chord and/or note forming aid 100 includes an LED readout 150 for the player to see which groups and specific chords, notes, and/or capo have been selected. The wall is sloped for easy access and visibility by the user. It will have an LED read out screen facing the player so that the player can see what chords and notes are now available to play. Also, six bidirectional keypads 152*a-f* are positioned on the top wall 104 of the keypad box housing 102 of the chord and/or note forming aid 100. Each of the bidirectional keypads 152*a-f* allows for switching in either direction and thereby ultimately offer 12 selections regarding the chords or notes within a specific song that a user desires to play. When one of the bidirectional keypads 152*a-f* on the chord and/or note forming aid 100 is selected for a specific chord or note and pressed, it causes separate devices (solenoids 132) to press down on the correct strings in the correct fret position for the guitar to play the selected chord or note. When the key is released the chord and/or note forming aid 100 will release the selected strings and the guitar will return to its original position.

The front wall 110 of the keypad box housing 102 is provided with the door 153 allowing access to the internal structure of the keypad box housing 102 for replacement of the rechargeable battery 146 and access to the control elements. The top wall 104 of the keypad box housing 102 also include four bidirectional keypads 154*a-d* to select from the various groups of stock songs, chords, notes, and/or capos. This set of bidirectional keypads 154*a-d* are used to select groups of songs and individual songs from within that group. As an alternative to rechargeable batteries, a/c power could be provided from an electric guitar via a thin cable running from a power source of the electric guitar along the back of the guitar neck and to an input on the chord and/or note forming aid 100. In accordance with another embodiment, an a/c power chord may be run from a remote power source to a power input of the chord and/or note forming aid.

Figure 3:
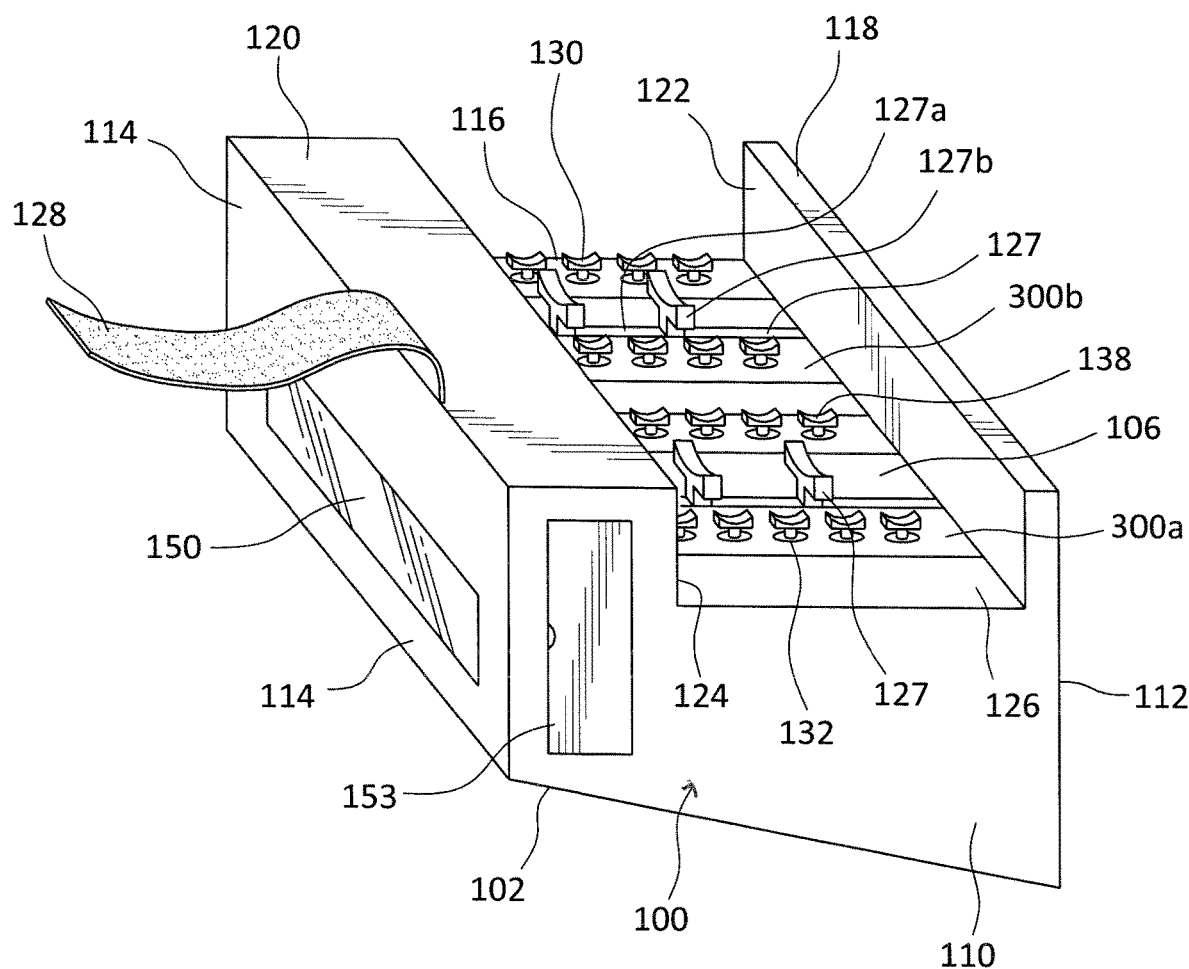
FIG. 3 is a perspective view of the chord and/or note forming aid shown inverted relative to the view shown in FIG. 2 (and with the strap harness open) to expose the view of the multi-position string engaging assemblies. As will be explained below in greater detail, there are four rows positioned to be just before the first four frets. Each row has six solenoids with each solenoid positioned to be over one of the six strings. Each solenoid has a 'C' shaped capture cap that helps capture the string. This allows the chord and/or note forming aid to work with guitars that have a different distance between their strings.
Figure 4:
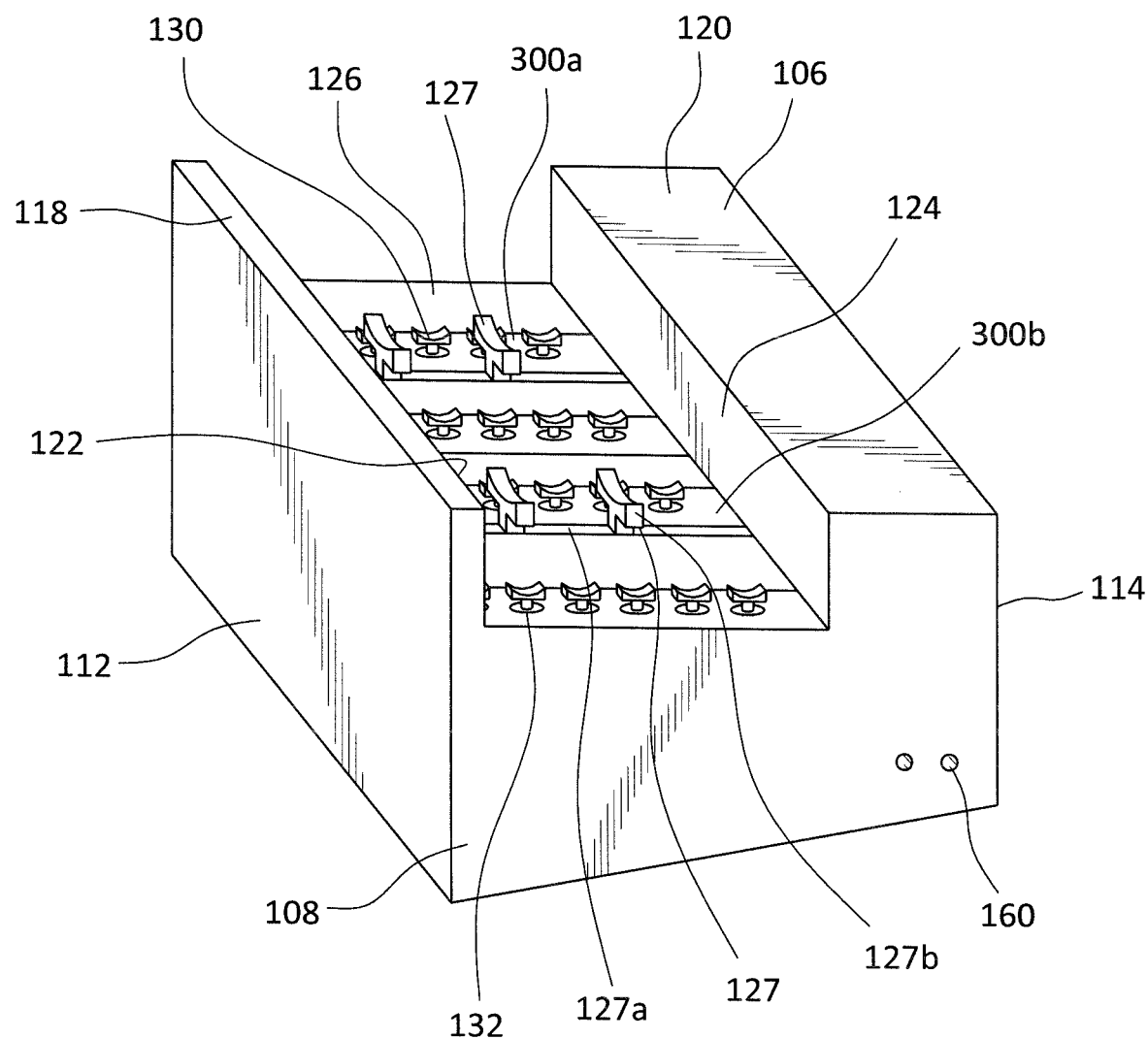
FIG. 4 is a perspective view of the chord and/or note forming aid shown from the opposite end of that shown in FIG. 3 (with the strap harness not shown).
Figure 5:
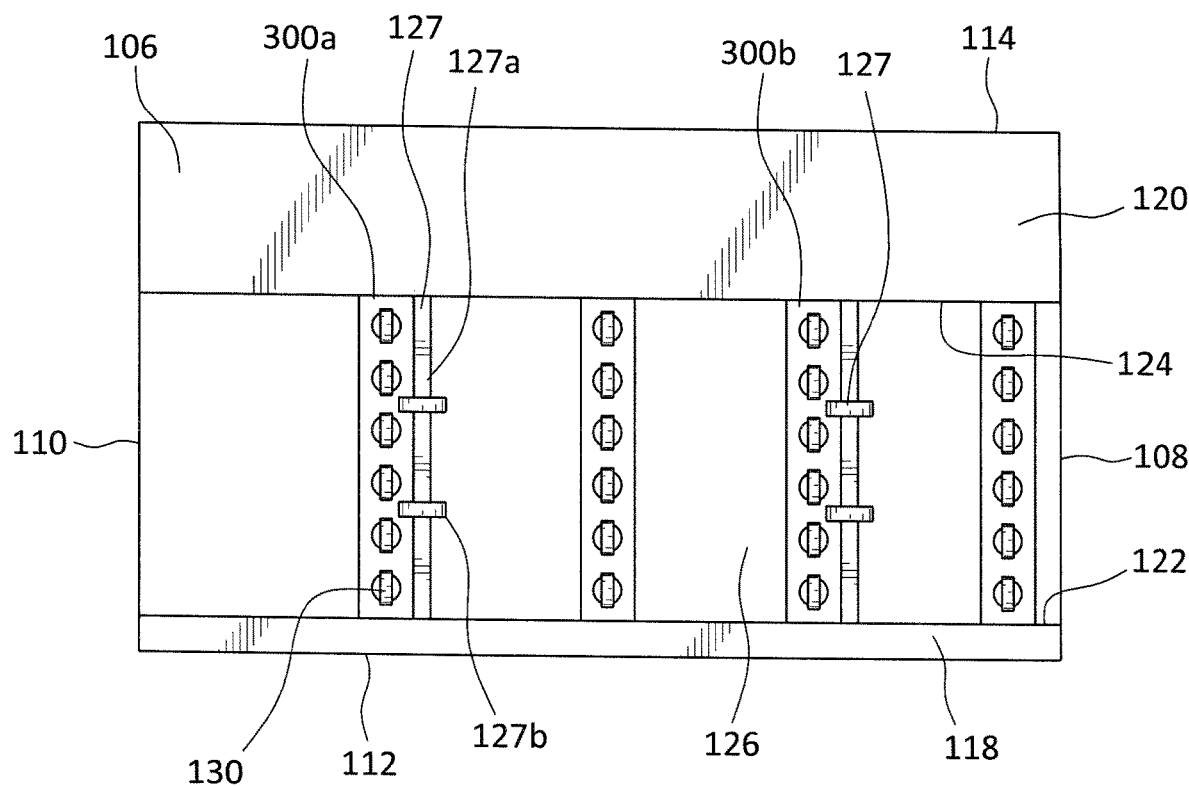
FIG. 5 is a bottom elevation view of the chord and/or note forming aid (with the strap harness not shown).
Figure 6:
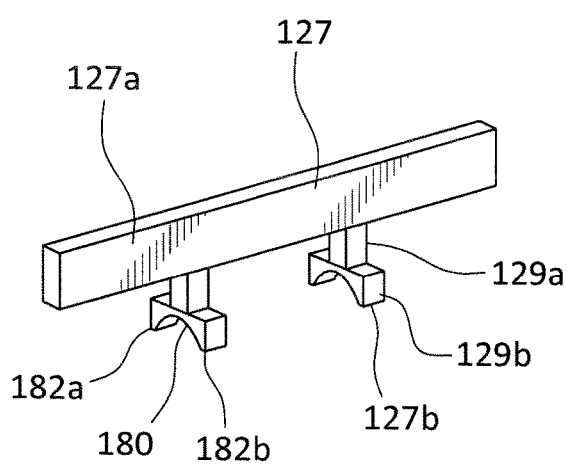
FIG. 6 is a detailed perspective view of a stabilizer pair devices for use in conjunction with the chord and note forming aid.
Figure 7:
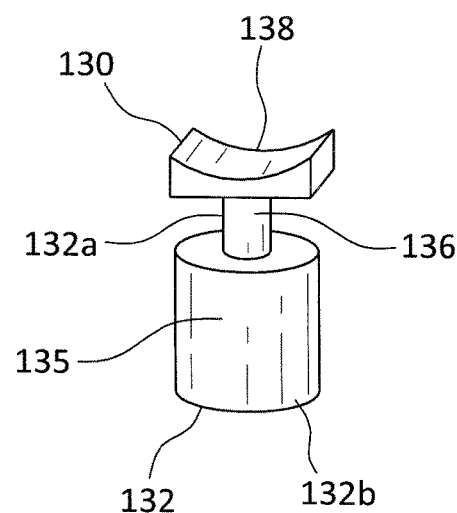
FIG. 7 is a perspective view of a multi-position string engaging assembly.
Figure 8:
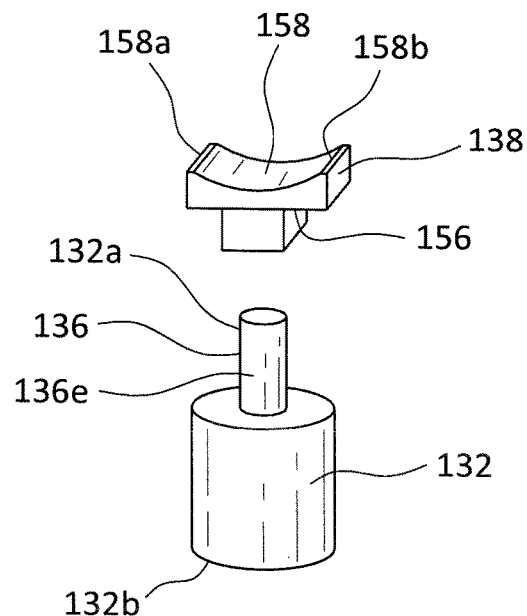
FIG. 8 is an exploded view of the multi-position string engaging assembly.
Figure 9:
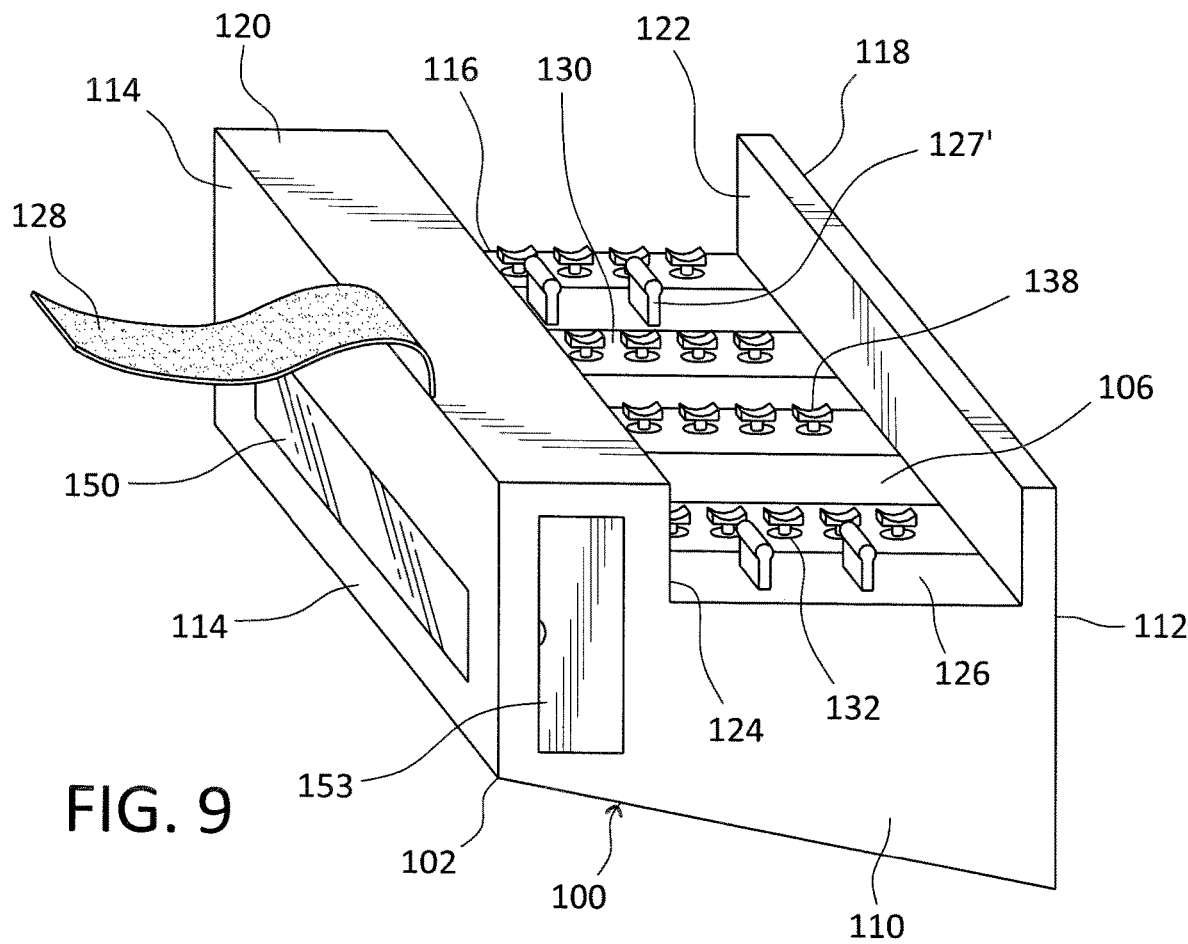
FIGS. 9, 10, and 11 are a perspective view (with the strap harness shown open), an opposite perspective view (with the strap harness not shown), and a bottom elevation view (with the strap harness not shown) of an alternate stabilizer embodiment for use in conjunction with the chord and/or note forming aid.
Figure 10:
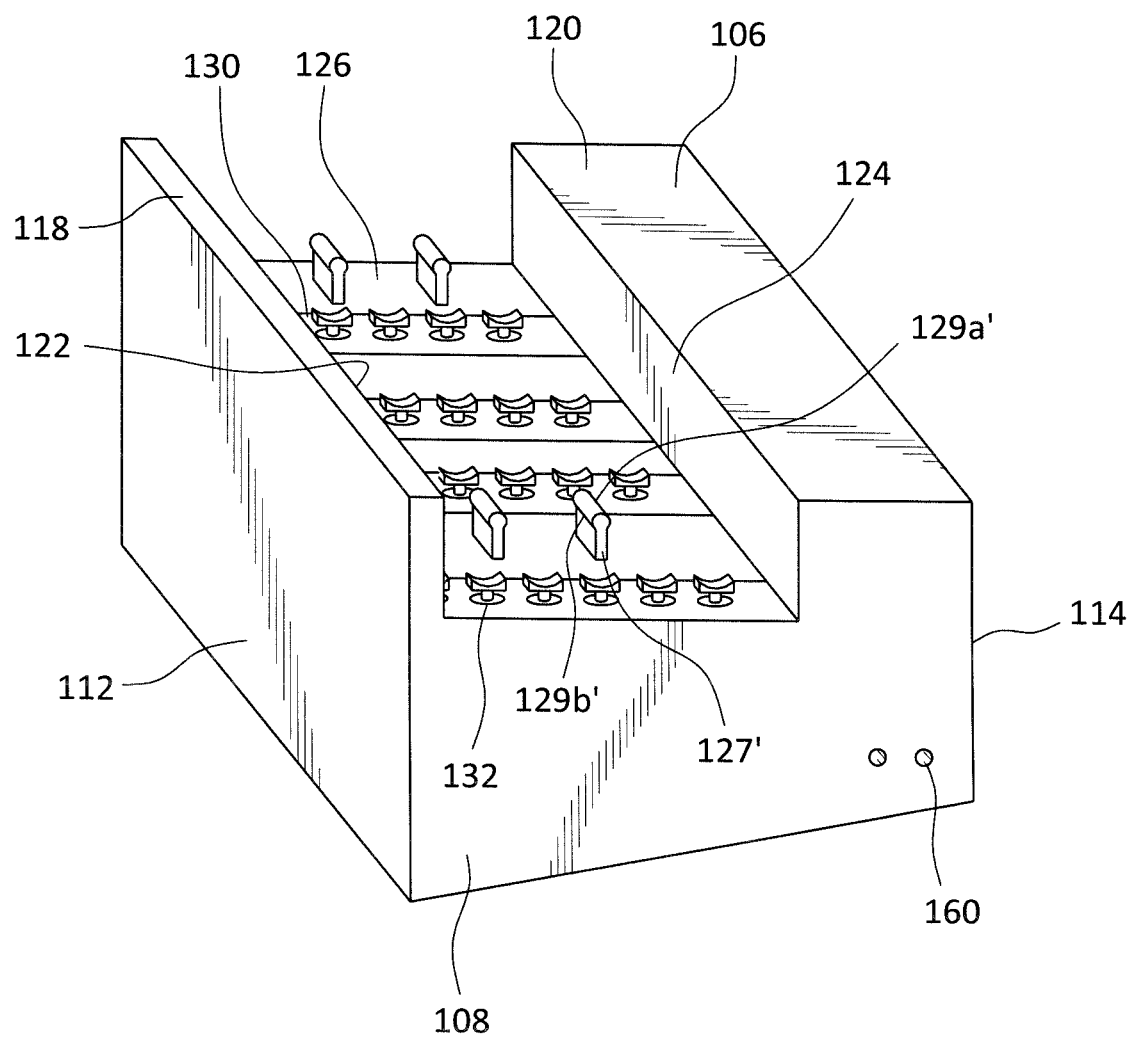
Figure 11:
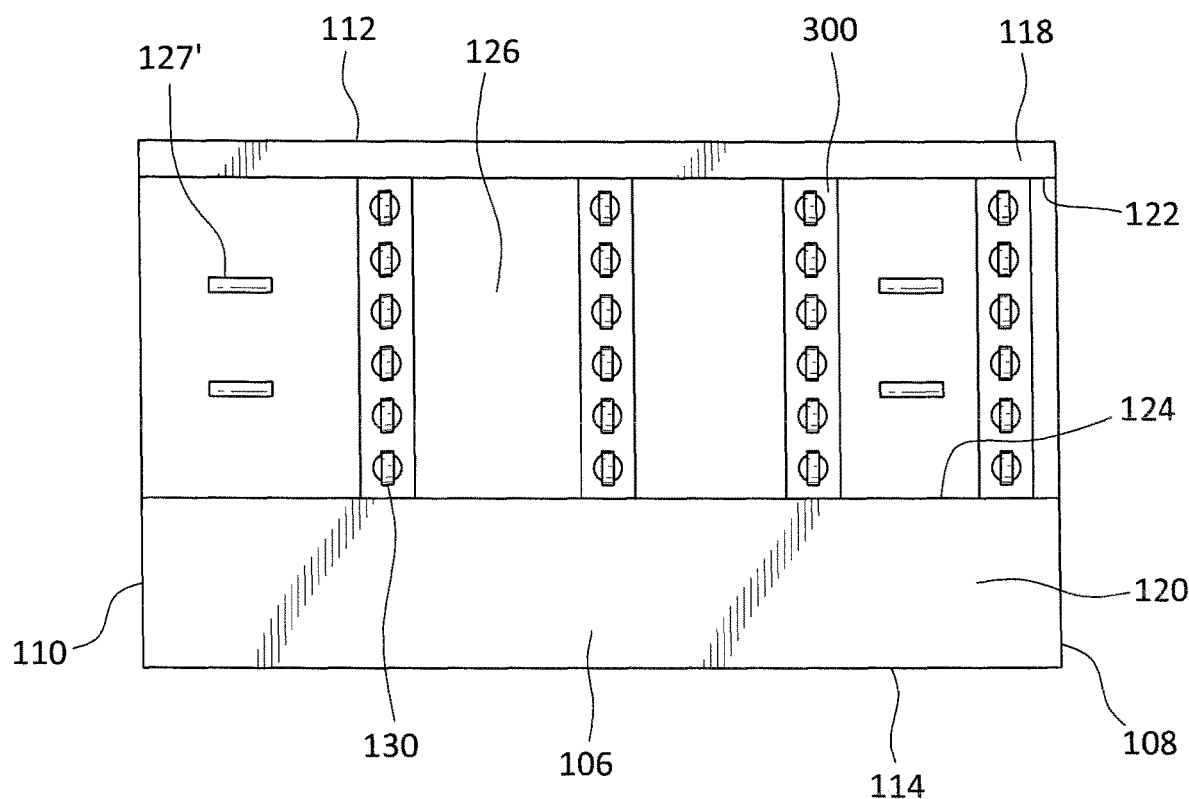
Figure 12:
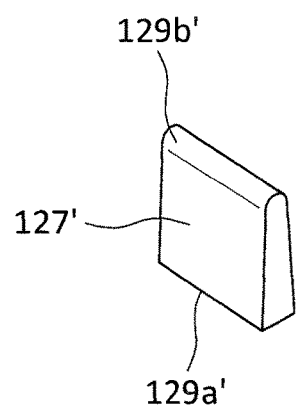
FIG. 12 is a detailed perspective view of the embodiment of a stabilizer as shown in FIGS. 9,10, and 11.
Figure 13A:
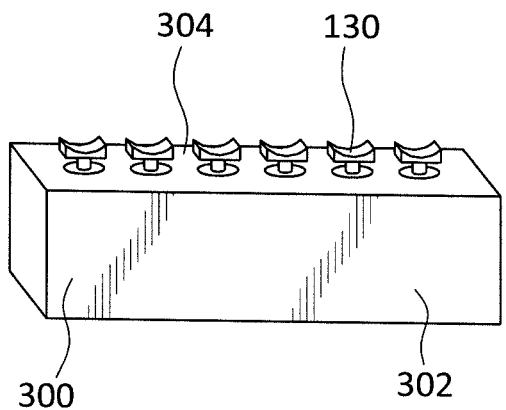
FIGS. 13A, 13B, and 13C are respectively a top perspective view, a bottom perspective view, and an exploded view showing use of solenoid six packs in accordance with the chord and note forming aid (although it is appreciated the solenoid six packs would similarly be used with the extension device).
Figure 13B:
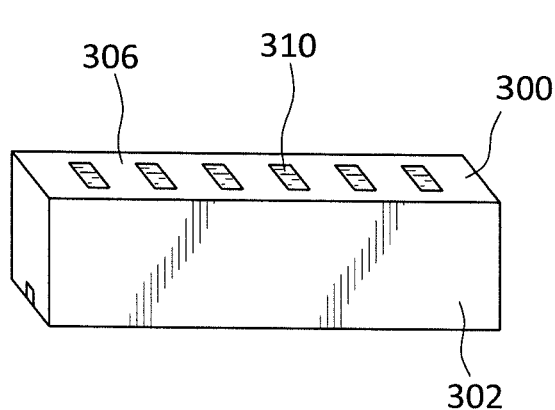
Figure 13C:
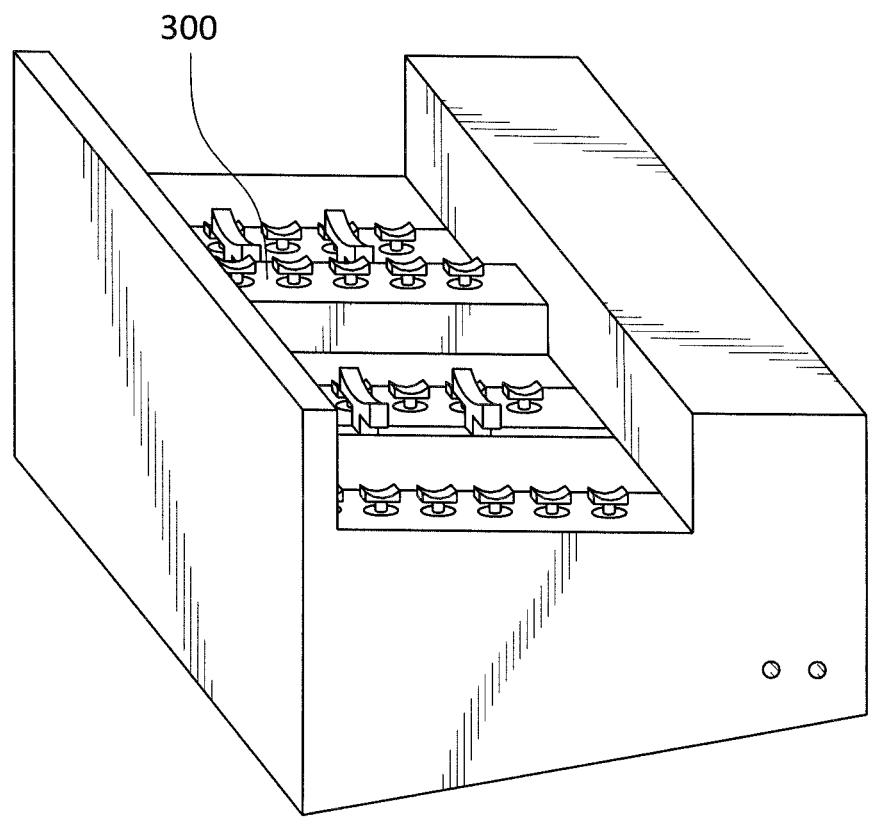

Referring to FIGS. 3, 4, and 5, the chord and/or note forming aid 100 is shown inverted to expose the multi-position string engaging assemblies 130. There are four rows that are shaped and dimensioned just before the first four frets. Each row has six multi-position string engaging assemblies 130 with each multi-position string engaging assemblies 130 positioned for engagement with one of the strings. As discussed above, each multi-position string engaging assemblies 130 has a C shaped capture cap 138 that helps capture the string. This allows the chord and/or note forming aid 100 to work with guitars that have different distances between their strings. In particular, and in accordance with a disclosed embodiment, the capture caps 138 are in the shape of a crescent moon. The capture caps 138 are attached to the end of the armatures 136 of the solenoids 132. Considering the shape of the capture cap 138, its bottom surface 156 includes a concave central section 158 at points 158*a*, 158*b* at opposite ends of the concave central section 158. The points 158*a*, 158*b* of the capture cap 138 are aligned to point at open spaces on opposite sides of a string. When activated, the concave central section 158 of crescent shaped capture cap 138 captures the guitar string, forces the string to the middle of the crescent shaped capture cap 138 then press the string down upon the guitar fret. This would allow for the player to make the desired chord or note to be played.

Figure 14:
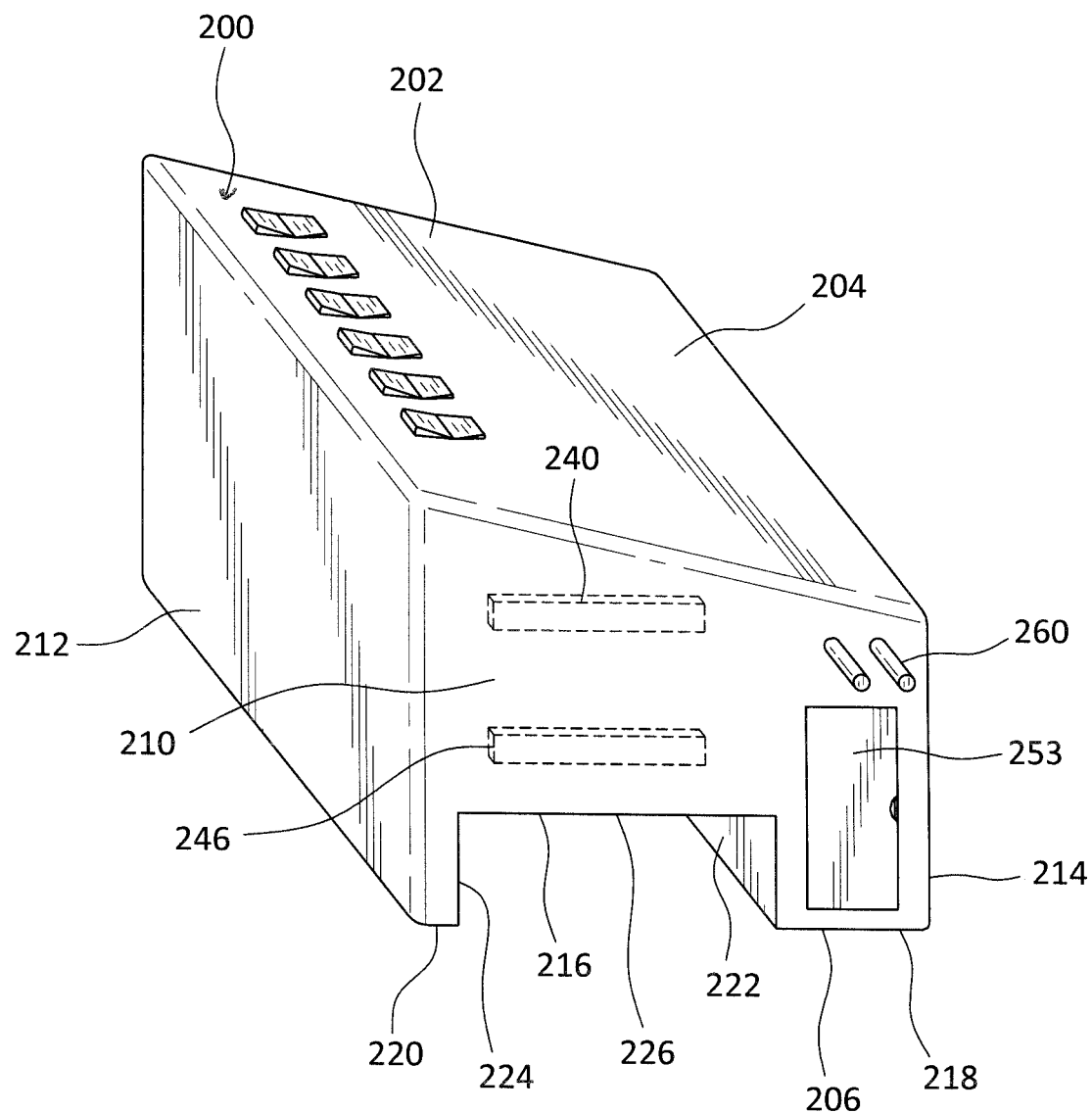
FIG. 14 is a perspective view of an extension device that may be plugged into the back of the chord and/or note forming aid to extend its abilities over the next eight frets for a total of twelve frets.
Figure 15:
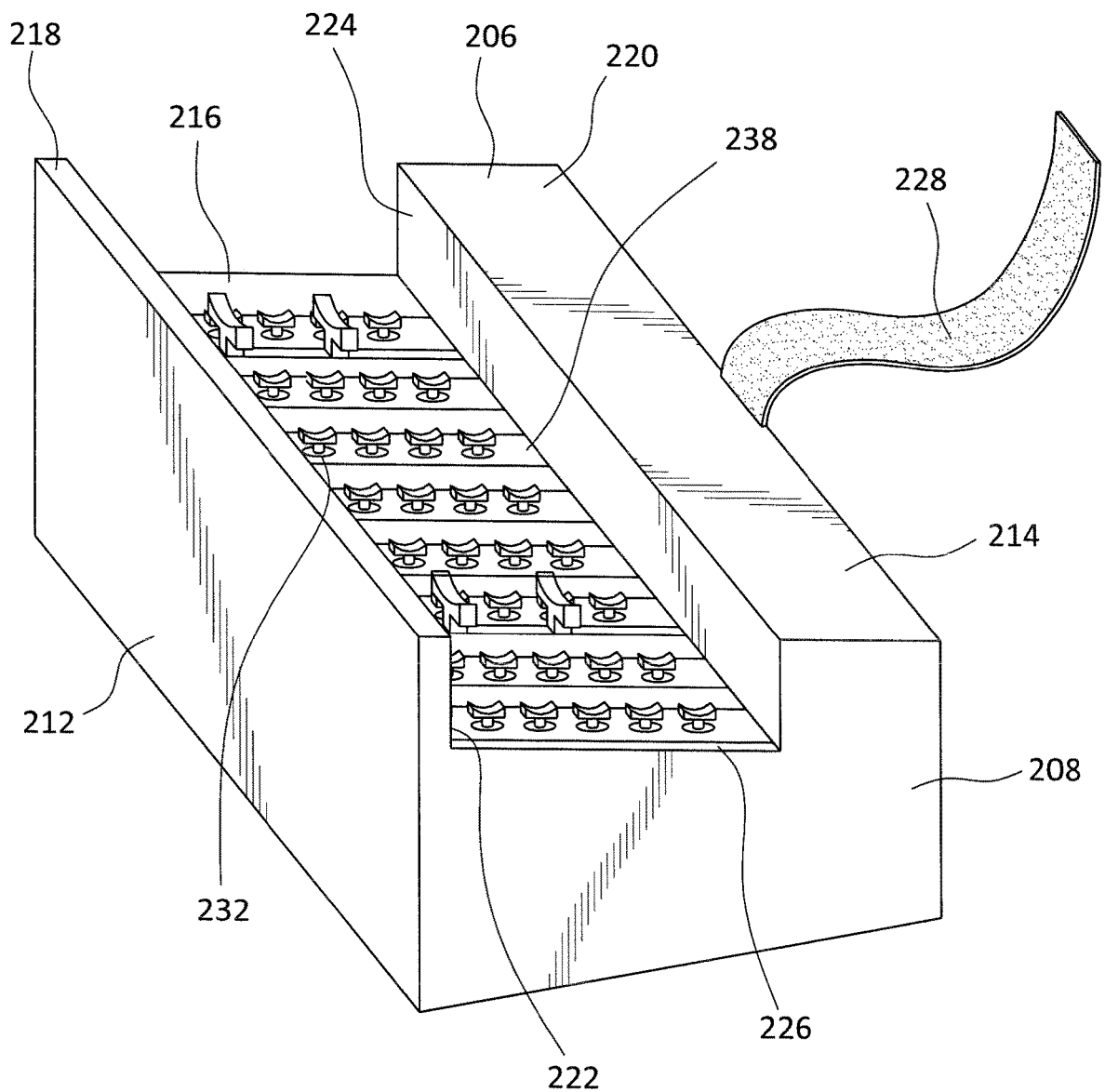
FIG. 15 is a perspective view of the extension device shown inverted (with the strap harness shown open) relative to the view shown in FIG. 13 to expose the view of the forty-eight multi-position string engaging assemblies. There are eight rows just before the fifth through the twelfth frets. Each row has six solenoids with each solenoid over one of the six strings.
Figure 16:
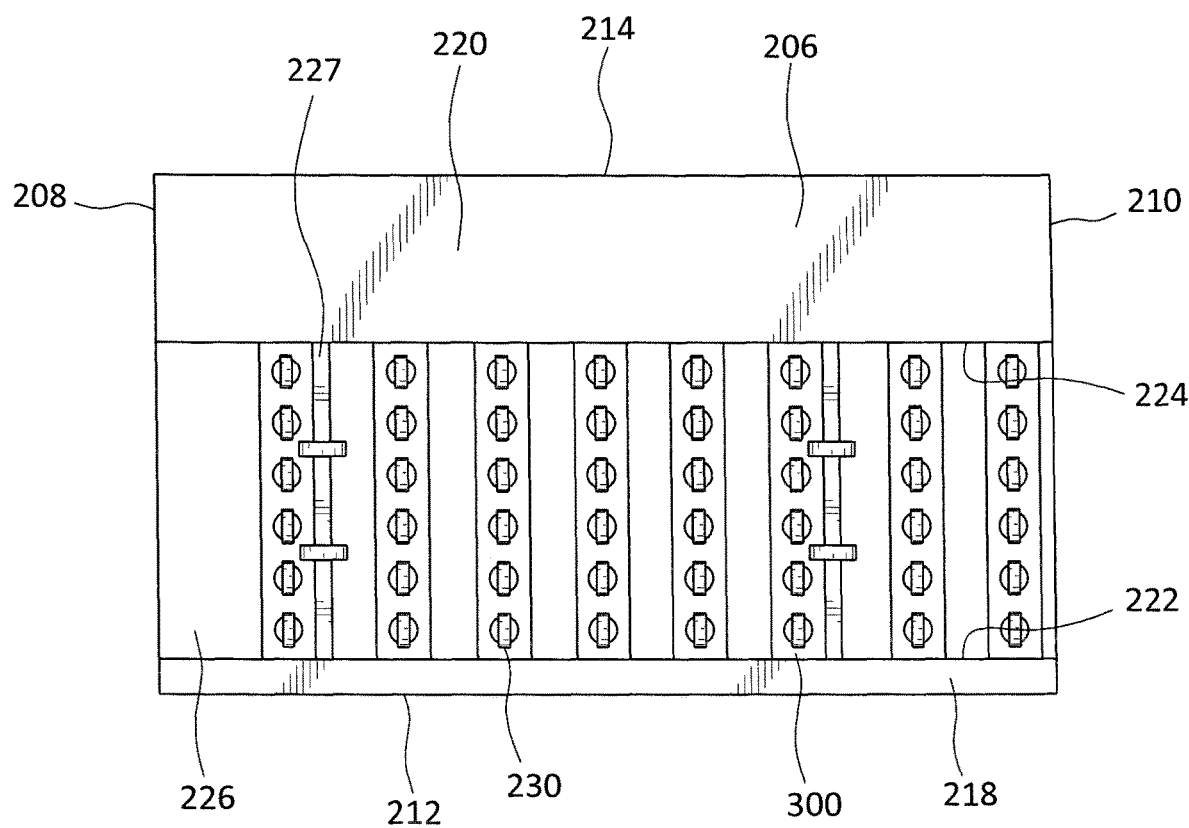
FIG. 16 is a bottom elevation view of the extension device (with the strap harness not shown).
Figure 18:
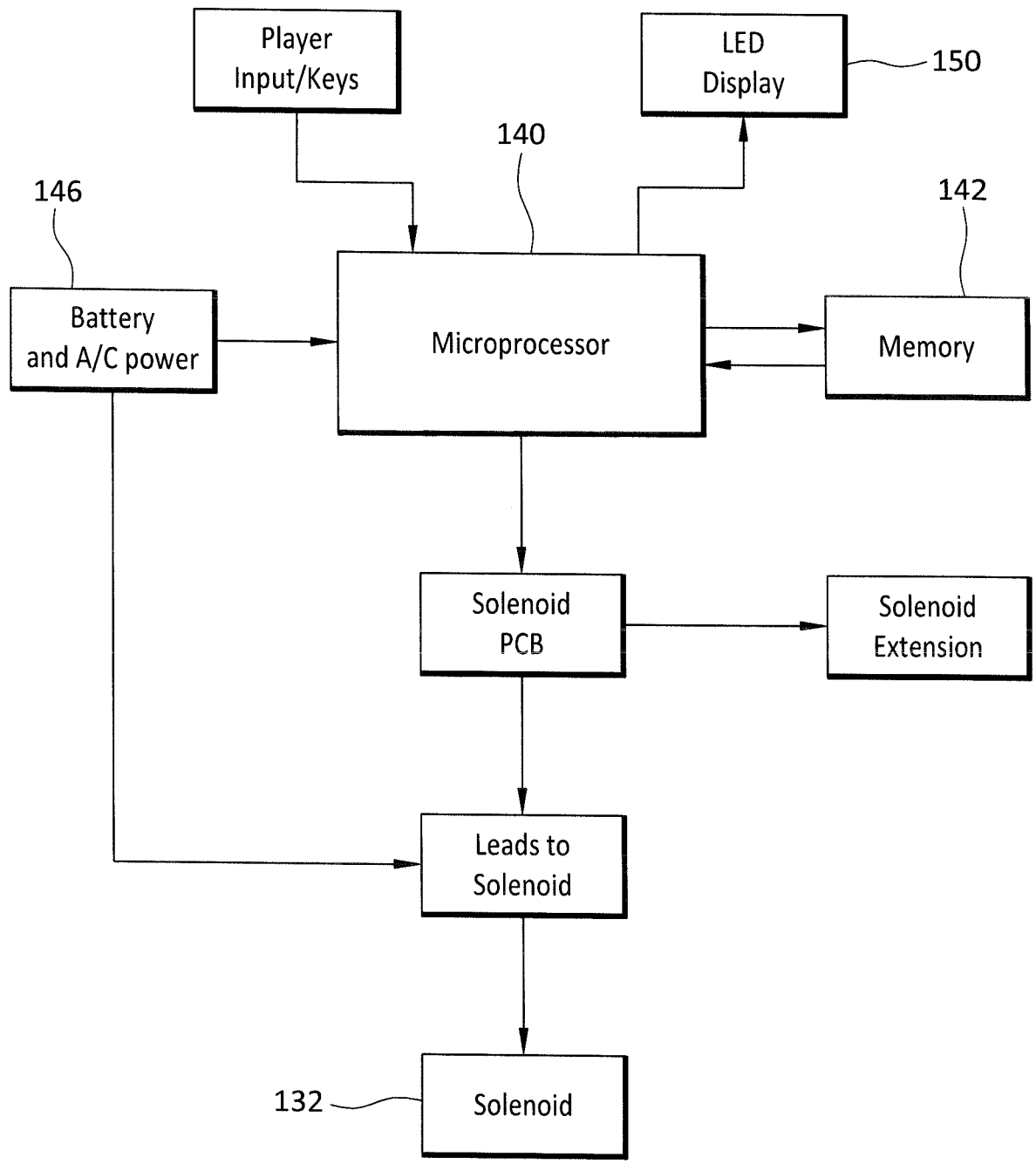
FIG. 18 is a schematic showing operational electronics of the present chord and/or assist assembly.

Further to the chord and/or note forming aid 100 discussed above, an extension device 200 is disclosed with reference to FIGS. 14 to 16. The extension device 200 is designed for positioning above the fourth through twelfth frets on the neck of the guitar and is electrically connected the primary chord and/or note forming aid 100 via mating ports 160, 260 provided on adjacent ends of the chord and/or note forming aid 100 and the extension device 200. The extension device 200 extends the abilities of the chord and/or note forming aid 100 from the fourth fret to the twelfth fret. This allows for chords and notes to be played in three times the area of the original chord and/or note forming aid 100. It also allows for new chords that may extend up to twelve frets and six strings—chords that are impossible to be played without a chord and/or note forming aid 100. New chords that will use the extension device 200 will be available on a website for free downloading.

The extension device 200 is structured in a manner similar to the chord and/or note forming aid 100. As such, the extension device 200 includes an extension device housing 202 shaped and dimensioned for positioning over the frets of a guitar in a manner allowing a user to generate chords with only one finger of a person playing the guitar. The extension device housing 202 includes a top wall 204, a bottom wall 206, a front wall 210 extending between the top wall 204 and the bottom wall 206, a rear wall 208 extending between the top wall 204 and the bottom wall 206, and lateral side walls 212, 214 extending between the top wall 204 and the bottom wall 206. The top wall 204, front wall 210, rear wall 208, and lateral side walls 212, 214 are generally flat. The bottom wall 206 is shaped to fit about the neck of the guitar in the area of the frets and includes a longitudinally extending, recessed section 216 that extends from the front wall 210 to the rear wall 208 and wraps about the neck of the guitar.

With this in mind, the bottom wall 206 includes first and second bottom wall segments 218, 220 that connect directly to the respective lateral walls 212, 214 and lie in plane that is generally perpendicular to the lateral walls 212, 214. The longitudinally extending, recessed section 216 is positioned between the first and second bottom wall segments 218, 220. The longitudinally extending, recessed section 216 is defined by first and second recess side wall segments 222, 224 and a recess base segment 226. The first and second recess side wall segments 222, 224 respectively extend from the first and second bottom wall segments 218, 220, and lie in plane that is generally parallel to the lateral walls 212, 214. The recess base segment 226 extends between from the first and second lateral recess side wall segments 222, 224, and lies in plane that is generally perpendicular to the lateral walls 212, 214. As such, the bottom wall 206 defines a generally U-shape when viewed along a cross section transverse to the longitudinal axis of the extension device housing 202.

The extension device housing 202 is held in position relative to the neck of the guitar through the provision of a strap harness 228 selectively extending across the longitudinally extending, recessed section 216 in a manner frictionally holding the neck of the guitar within the longitudinally extending, recessed section 216. In accordance with a disclosed embodiment, the strap harness 228 is wide Velcro strap will secure the extension device 200 around the neck of the guitar. While straps are provided in accordance with a disclosed embodiment, it is appreciated a variety of retaining mechanisms could be employed without departing form the spirit of the present invention.

In accordance with a preferred embodiment, the extension device 200 is about 7¼ inches long and slightly wider than the guitar neck (for example, approximately 3¼ inches wide). It plugs into the chord and/or note forming aid 100 and covers the neck area from fret four to fret twelve.

The working components of the present extension device 200 are housed within the extension device housing 202 for operation in the manner described below. Actuation of the guitar strings is achieved by the provision of a plurality of multi-position string engaging assemblies 230 that engage strings of the guitar in a controlled manner so as to define chords associated with playing the guitar. Each of the multi-position string engaging assemblies 230 includes a solenoid 232 extending from an aperture 234 formed in the recess base segment 226 of the bottom wall 206. Each of the solenoids 232 is structured in the same manner as those of the chord and/or note forming aid 100. As such, they include a first end and a second end. The first end includes the coil in which the armature is positioned, and the second end includes the extended portion of the armature. A string capture cap 238 is secured to the extended end of the armature. The string capture cap 238 is shaped and dimensioned to engage the strings of the guitar when the solenoid 232 is actuated.

In accordance with a disclosed embodiment, 48 multi-position string engaging assemblies 230 are provided. The multi-position string engaging assemblies are positioned for engagement with each of the six strings of the guitar at eight different fret locations. As such, the multi-position string engaging assemblies are arranged in the eight rows of six solenoids extending lateral across the bottom wall 206, in particular, the recess base segment.

Control of the solenoids 232 of the multi-position string engaging assemblies 230 is achieved through the provision of an electronic microprocessor circuit board 240 electrically linked to the control electronics of the forming aid 100 which provides the extension device 200 with operating instructions for the controlled actuation of the multi-position string engaging assemblies 230. As such, the extension device 200 only needs the microprocessor circuit board 240 and battery(ies) 246. A door 253 for accessing the microprocessor circuit board 240 and the battery(ies) is also provided.

In addition, the top wall 204 of the extension device 200 is provided with actuation interface mechanisms in the form of six bidirectional keypads 252a-f. Each bidirectional key 252a-f may be switch in either direction offering 12 selections. While keypads are provided with the extension device 200, it is appreciated the extension device may be formed without such keypads and the operation of the extension device would be controlled by actuation of the forming aid 100. The front wall 210 of the extension device 200 is provided with door 253 allowing access for replacement of the rechargeable battery.

The underside of the extension device 200 is similar to the chord and/or note forming aid 100 and is maintained above the strings using either of the embodiments described above, with the exception that the extension device 200 has eight rows of multi-position string engaging assemblies 230.

As mentioned above, the present chord and/or note assist assembly 10 provides a computerized device for both beginner and existing guitar players. For beginner guitar players of all ages, it builds confidence and helps avoid quitting. It allows beginners to play complete songs within the first week. Existing guitar players and composers can make and play chords that are impossible to play without the chord and/or note assist assembly 10.

The beginner guitar players have two primary challenges: (1) overcoming hurt left-hand fingers from pressing the strings and (2) remembering the placement of the left-hand fingers to make the notes and chords. Over time and with practice and patience, players develop calluses on their fingers which stops the hurt. With practice, players will remember the placement of their fingers for the chords and notes. But many beginners want earlier results. This causes frustration and that causes close to ninety percent of them quit.

The chord and/or note assist assembly 10 easily attaches to an acoustic or electric guitar and enables a beginner guitar player to easily produce guitar chords or notes by pressing one button and strumming the strings without hurt fingers. It is not designed to replace practice or patience, but to help build confidence for the beginner so that they will not quit—much like training wheels on a bicycle.

All guitar notes and many chords are pre-programmed in the chord and/or note assist assembly 10. Plus, the user will be able to easily add other chords including chords that they invent plus chords that are impossible to play without the chord and/or note assist assembly 10 such as chords needing five or six fingers.

The chord and/or note assist assembly 10 allows users to choose specific chords and/or notes and place them in correct order in memory for specific songs. Then the player only needs to strum the first chosen chord or note, and the second chosen chord or note will be in place for the next strum. Thus, a song with chords and/or notes can be played in its entirety by a beginner.

All guitar necks are similar in that the spacing of the frets is exactly the same. Technically, guitar frets are spaced by ratios of the twelfth root of two. This means that the length of the vibrating portion of the string on a fret relative to the next fret will also have the ratio. The string vibrates twice as fast when you half its length. This is an octave higher. Thus, in half the space of the first 12 frets you need to have 12 more frets.

However, the space between the individual strings of guitars varies slightly. At the first fret of a guitar the first and sixth strings are about one and one-half inches apart. This varies by an eighth of an inch depending on the manufacturer and the style of guitar.

The chord and/or note assist assembly 10 will fit any guitar because on the end of the solenoids that press down on the strings are capture caps that are wide enough to fit all guitars and thus capture and press any string.

The chord and/or note forming aid 100 and extension device 200 includes a number of 'Solenoid Six Packs' 300 (referred to as 300a and 300b with reference to the embodiment disclosed in FIGS. 3 to 5) that are easily replaceable by the user. The solenoids are grouped into 'six-packs' so that if a solenoid becomes inoperative the six-pack can be easily removed and a new six-pack put in its place. The chord and/or note forming aid 100 uses four 'Solenoid Six Packs' and the extension device uses eight. As shown with reference to FIGS. 13A, 13B, and 13C, each of the solenoid six packs 300 includes a housing 302 in which six (6) multi-position string engaging assemblies 130, 230 are positioned. The capture caps 138, 238 of the multi-position string engaging assemblies 130, 230 extend from a top end 304 of the housing 302, while the bottom 306 of the housing 302 is provided with contacts 310 for connecting the multi-position string engaging assemblies 30 with the control electronics.

In summary, the chord and/or note forming aid 100 and extension device 200 offer the following unique abilities:

The keypads can be programmed to play notes and chords or capo.

Press one button to make any chord, note or capo.

Program the chords and/or notes for an entire song then all that is needed is to strum at the proper time to play the song.

Make chords that humans can not physically make by pressing down on four or five or six strings in one chord.

Upload to and download from the chord and/or note assist assembly 10 website users' library of programmed chords for whole songs as well as newly discovered and invented chords.

The chord and/or note assist assembly 10 is unlike any device designed to make guitar playing easier that has come before it. It is also designed to work with both beginners needing 'training wheels' and experienced players inventing new chords. The chord and/or note assist assembly 10 allows users to make all known chords and notes plus allow players to invent their own new chords.

Figure 19:
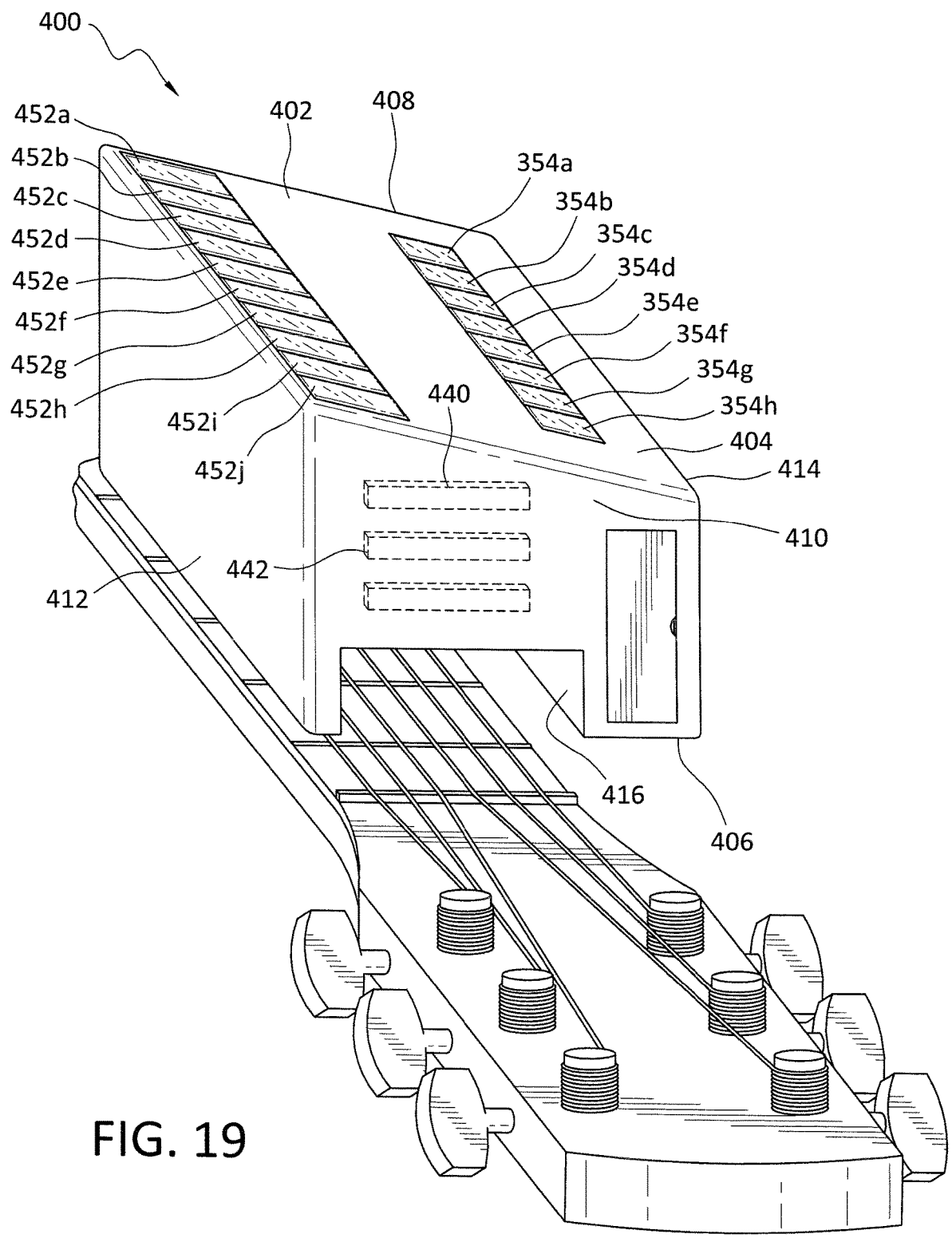
FIGS. 19 and 20 are respectively a front perspective of a chord and/or note forming aid and an extension device in accordance with an alternate embodiment.
Figure 20:
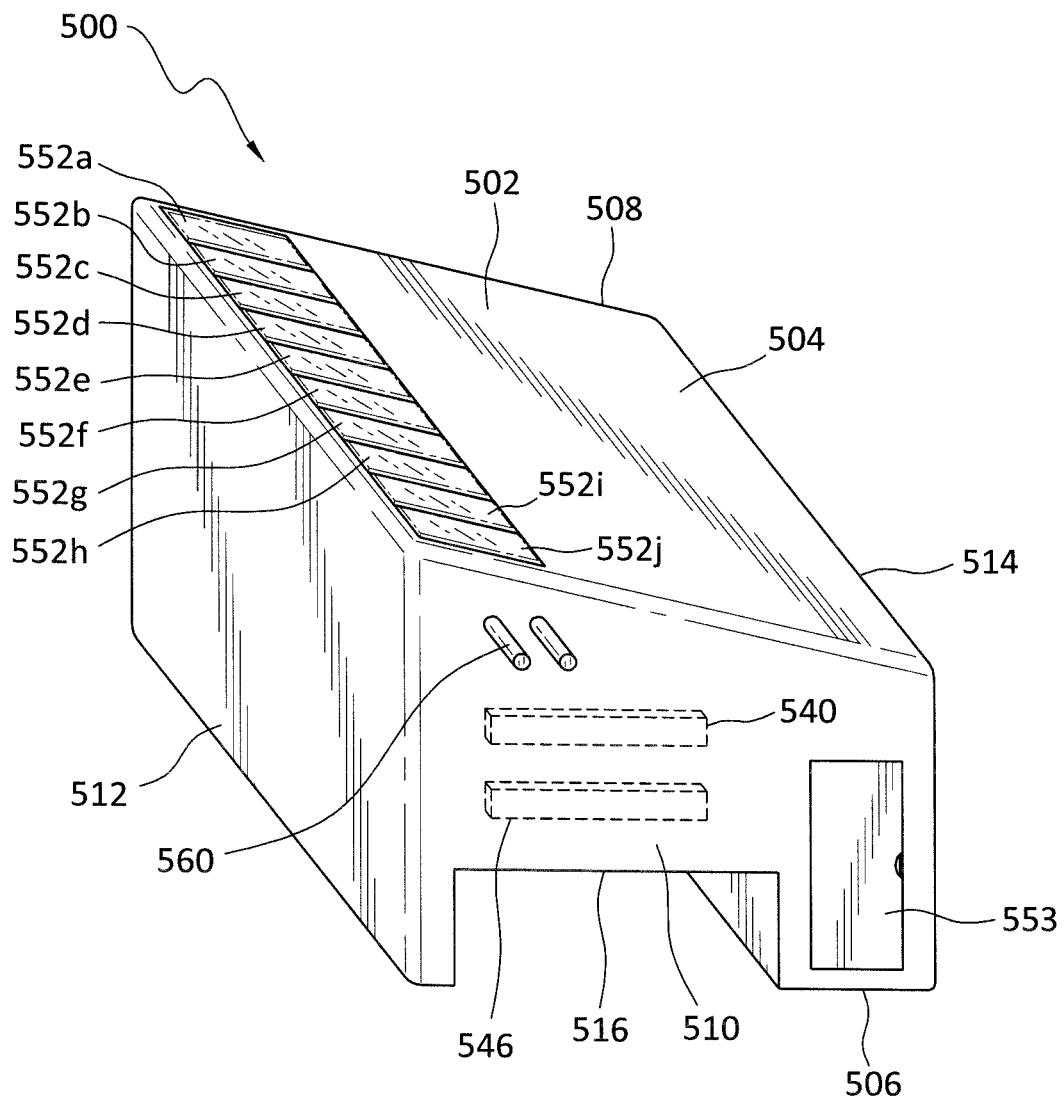

In accordance with an alternate embodiment, and with reference to FIGS. 19 and 20, the chord and/or note assist assembly disclosed above with reference to FIGS. 1 to 18 is modified with respect to the actuation interface mechanism by replacing the bidirectional keypad(s) with keys as the interface mechanism for controlling actuation of the chord and/or note forming aid 400 and an extension device 500. In addition, the number of keys is increased and they are easy to use. As will be appreciated based upon the following disclosure, there are ten 'Finger keys' (from six) that are larger (preferably, ½ inch wide and 1 inch long) and at the edge of the housing for easier use. The number and size of control keys is also increased for selecting groups of chords and notes from four to eight with preferred dimensions of ¼ inch wide and ½ inch long.

As disclosed with reference to FIGS. 19 and 20, the chord and/or note assist assembly includes a chord and/or note forming aid 400 and an extension device 500 for playing fretted instruments. With the exception of the modified keys, the chord and/or note forming aid 400 and an extension device 500 are structurally the same as those disclosed above with reference to FIGS. 1 to 18.

The chord and/or note forming aid 400 includes a keypad box housing 402 shaped and dimensioned for positioning over the frets of a guitar in a manner allowing a user to generate chords with only one finger of a person playing the guitar. The keypad box housing 402 includes a top wall 404, a bottom wall 406, a front wall 410 extending between the top wall 404 and the bottom wall 406, a rear wall 408 extending between the top wall 404 and the bottom wall 406, and lateral side walls 412, 414 extending between the top wall 404 and the bottom wall 406. The top wall 404, front wall 410, rear wall 408, and lateral side walls 412, 414 are generally flat. The bottom wall 406 is shaped to fit above the neck of the guitar in the area of the frets and includes a longitudinally extending, recessed section 416 that extends from the front wall 410 to the rear wall 408 and wraps about the neck of the guitar. The bottom wall 406 is as described above with reference to the embodiments disclosed with reference to FIGS. 1 to 18. The keypad box housing 402 is held in position relative to the neck of the guitar through the provision of a strap harness as described above with reference to the embodiments disclosed with reference to FIGS. 1 to 18.

As with the embodiment described above with reference to the embodiments disclosed with reference to FIGS. 1 to 18, the working components of the present chord and/or note forming aid 400 are housed within the keypad box housing 402 for operation in the manner described herein. Control of the solenoids of the multi-position string engaging assemblies is achieved through the provision of a control system defined by an electronic microprocessor circuit board 440 electrically linked to a solid-state memory 442 (that may be integrated with the circuit board or electrically linked thereto), and ultimately powered by a battery 444. The electronic microprocessor circuit board 440 is electrically linked to the solenoids to control extension and retraction of the armatures in a predefined manner Actuation of the solenoids is achieved using known actuation circuitry in conjunction with keys 452a-j on the top wall 402 that are pressed to send signals to the electronic microprocessor circuit board 440 identifying chords and/or notes of a song and the electronic microprocessor circuit board 440 thereafter instructs the required solenoids to extend and engage desired strings of the guitar. As mentioned above, and in accordance with other implementations, chords and/or notes of a song are preprogrammed into the chord and/or note assist assembly 10 so that all that is required for the player do is press a sequence of keypads 452a-f to start a song and, thereafter, the user need only strum and the next chord/not is automatically in place for the next strum. The top wall 404 of the keypad box housing 402 also include four bidirectional keypads 454a-d to select from the various groups of stock songs, chords, notes, and/or capos. This set of bidirectional keypads 454a-d are used to select groups of songs and individual songs from within that group. Additionally, chord and/or note assist assembly users will have use of a website that will be available for both uploading and downloading chords, notes, capos and/or full songs.

Further to the chord and/or note forming aid 400 discussed above, an alternate embodiment of an extension device 500 is disclosed with reference to FIG. 20. The extension device 500 is designed for positioning above the fourth through twelfth frets on the neck of the guitar and is electrically connected the primary chord and/or note forming aid 400 via mating ports 560 provided on adjacent ends of the chord and/or note forming aid 400 (not shown, but identical to the embodiment disclosed with reference to FIG. 4) and the extension device 500. The extension device 500 includes an extension device housing 502 shaped and dimensioned for positioning over the frets of a guitar in a manner allowing a user to generate chords with only one finger of a person playing the guitar. The extension device housing 502 includes a top wall 504, a bottom wall 506, a front wall 510 extending between the top wall 504 and the bottom wall 506, a rear wall 508 extending between the top wall 504 and the bottom wall 506, and lateral side walls 512, 514 extending between the top wall 504 and the bottom wall 506. The top wall 504, front wall 510, rear wall 508, and lateral side walls 512, 514 are generally flat. The bottom wall 506 is shaped to fit about the neck of the guitar in the area of the frets and includes a longitudinally extending, recessed section 516 that extends from the front wall 510 to the rear wall 508 and wraps about the neck of the guitar. The bottom wall 506 is as described above with reference to the embodiments disclosed with reference to FIGS. 1 and 18. The extension device housing 502 is held in position relative to the neck of the guitar through the provision of a strap harness as described above with reference to the embodiments disclosed with reference to FIGS. 1 to 18. The extension device housing 502 is held in position relative to the neck of the guitar through the provision of a strap harness as described above with reference to the embodiments disclosed with reference to FIGS. 1 to 18.

The working components of the present extension device 500 are housed within the extension device housing 502 for operation in the manner described herein. Control of the solenoids of the multi-position string engaging assemblies is achieved through the provision of an electronic microprocessor circuit board 540 electrically linked to the control electronics of the chord and/or note forming 400 which provides the extension device 500 with operating instructions for the controlled actuation of the multi-position string engaging assemblies. As such, the extension device 500 only needs the microprocessor circuit board 540 and battery(ies) 546. A door 553 for accessing the microprocessor circuit board 540 and the battery(ies) is also provided.

The top wall 504 of the extension device 500 is provided with eight keys 552*a-h*. Each bidirectional key 552*a-h* may be switch in either direction offering 12 selections. While keypads are provided with the extension device 500, it is appreciated the extension device may be formed without such keypads and the operation of the extension device would be controlled by actuation of the forming aid 500. The front wall 510 of the extension device 500 is provided with door 553 allowing access for replacement of the rechargeable battery.

The keys described above, also includes LED screens that allow identification of which key should be pressed. When a specific song is requested, the electronic microprocessor circuit board and the solid-state memory work in conjunction to send the correct key number to be pressed as well as the next few keys in the correct order to the LED screens defined by the keys. This will allow the player to be prepared to press the correct keys in advance. Each key when pressed causes the correct solenoid(s) to move into position to make the requested note or chord. The player then strums the guitar strings to make the requested sound. Then when the key is released, the solenoid returns to the resting position. The memory management chips making up the solid-state memory will be large enough (at least 64 gigabit) to hold all the known guitar notes and chords as well as much more memory for storage of songs, newly invented chords and notes and much more.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A chord and/or note assist assembly, comprising:
a chord and/or note forming aid including a plurality of multi-position string engaging assemblies that engage strings of a guitar in a controlled manner so as to define chords associated with playing a guitar, the chord and/or note forming aid includes a keypad box housing having a top wall, a bottom wall, a front wall extending between the top wall and the bottom wall, a rear wall extending between the top wall and the bottom wall, and lateral side walls extending between the top wall and the bottom wall, the chord and/or note forming aid further including an actuation interface mechanism in the form of a plurality of bidirectional keypads is provided on the top wall for controlling the plurality of multi-position string engaging assemblies;
an extension device including a plurality of multi-position string engaging assemblies that engage strings of a guitar in a controlled manner so as to define chords associated with playing a guitar, the extension device includes an extension device housing having a top wall, a bottom wall, a front wall extending between the top wall and the bottom wall, a rear wall extending between the top wall and the bottom wall, and lateral side walls extending between the top wall and the bottom wall, the extension device further including an actuation interface mechanism in the form of a plurality of bidirectional keypads is provided on the top wall for controlling the plurality of multi-position string engaging assemblies;
the chord and/or note forming aid and the extension device include respective mating ports electrically connecting the chord and/or note forming aid and the extension device; and
an electronic microprocessor circuit board electrically linked to a solid-state memory to control the plurality of multi-position string engaging assemblies of both the chord and/or note forming aid and the extension device.

2. The chord and/or note assist assembly according to claim 1, wherein the bottom wall includes a recessed section shaped and dimensioned in such a way that the neck of the guitar may be positioned therein.

3. The chord and/or note assist assembly according to claim 2, wherein the bottom wall includes first and second bottom wall segments that connect directly to the respective lateral walls and lie in a plane that is generally perpendicular to the respective lateral wall and the recessed section is positioned between the first and second bottom wall segments.

4. The chord and/or note assist assembly according to claim 3, wherein the recessed section is defined by first and second recess side wall segments and a recess base segment.

5. The chord and/or note assist assembly according to claim 2, further including a strap harness selectively extending across the recessed section in a manner frictionally holding a neck of a guitar within the recessed section.

6. The chord and/or note assist assembly according to claim 5, wherein the strap harness is wide hook and loop fastener strap.

7. The chord and/or note assist assembly according to claim 1, wherein each of the multi-position string engaging assemblies includes a solenoid extending from an aperture formed in the bottom wall.

8. The chord and/or note assist assembly according to claim 7, wherein each of the solenoids includes a first end and a second end, the first end includes a coil in which an armature is positioned and the second end includes an extended portion of the armature.

9. The chord and/or note assist assembly according to claim 8, wherein a string capture cap is secured to the free end of the extended portion of the armature, and the string capture cap is shaped and dimensioned to engage the strings of a guitar when the solenoid is actuated.

10. The chord and/or note assist assembly according to claim 1, further including a wireless transceiver integrated with, or electrically coupled to the electronic microprocessor circuit board.

11. The chord and/or note assist assembly according to claim 1, wherein the chord and/or note forming aid includes an LED readout.

12. The chord and/or note assist assembly according to claim 1, wherein the bottom wall includes a recessed section shaped and dimensioned in such a way that the neck of the guitar may be positioned therein.

13. The chord and/or note assist assembly according to claim 12, wherein the bottom wall includes first and second bottom wall segments that connect directly to the respective lateral walls and lie in a plane that is generally perpendicular to the respective lateral wall and the recessed section is positioned between the first and second bottom wall segments.

14. The chord and/or note assist assembly according to claim 13, wherein the recessed section is defined by first and second recess side wall segments and a recess base segment.

15. The chord and/or note assist assembly according to claim 12, further including a strap harness selectively extending across the recessed section in a manner frictionally holding a neck of a guitar within the recessed section.

16. The chord and/or note assist assembly according to claim 15, wherein the strap harness is wide hook and loop fastener strap.

17. A chord and/or note assist assembly, comprising:
a chord and/or note forming aid including a plurality of multi-position string engaging assemblies that engage strings of a guitar in a controlled manner so as to define chords associated with playing a guitar, the chord and/or note forming aid includes a keypad box housing having a top wall, a bottom wall, a front wall extending between the top wall and the bottom wall, a rear wall extending between the top wall and the bottom wall, and lateral side walls extending between the top wall and the bottom wall, the chord and/or note forming aid further including an actuation interface mechanism in the form of a plurality of bidirectional keypads is provided on the top wall for controlling the plurality of multi-position string engaging assemblies, the top wall being slightly sloped for both easy vision and access by the user; and
an electronic microprocessor circuit board electrically linked to a solid-state memory to control the plurality of multi-position string engaging assemblies of both the chord and/or note forming aid and the extension device.

* * * * *